United States Patent
Waldemarson

(10) Patent No.: US 12,541,921 B2
(45) Date of Patent: Feb. 3, 2026

(54) RAY TRACING GRAPHICS PROCESSING USING MICROMAPS

(71) Applicant: Arm Limited, Cambridge (GB)

(72) Inventor: Gustaf Daniel Waldemarson, Lund (SE)

(73) Assignee: Arm Limited, Cambridge (GB)

( * ) Notice: Subject to any disclaimer, the term of this patent is extended or adjusted under 35 U.S.C. 154(b) by 209 days.

(21) Appl. No.: 18/509,709

(22) Filed: Nov. 15, 2023

(65) Prior Publication Data
US 2025/0157145 A1 May 15, 2025

(51) Int. Cl.
  G06T 1/20     (2006.01)
  G06T 15/00    (2011.01)
  G06T 15/06    (2011.01)
  G06T 17/00    (2006.01)

(52) U.S. Cl.
  CPC .............. G06T 17/005 (2013.01); G06T 1/20 (2013.01); G06T 15/005 (2013.01); G06T 15/06 (2013.01)

(58) Field of Classification Search
  CPC ......... G06T 1/20; G06T 15/005; G06T 15/06; G06T 17/005
  USPC .................................................. 345/419, 426
  See application file for complete search history.

(56) References Cited

U.S. PATENT DOCUMENTS

| 2016/0071312 A1* | 3/2016 | Laine ...................... G06T 17/10 345/419 |
| 2023/0084570 A1* | 3/2023 | Muthler .................. G06T 15/50 345/426 |
| 2023/0108967 A1 | 4/2023 | Moreton et al. |

FOREIGN PATENT DOCUMENTS

GB  2614351 A  7/2023

OTHER PUBLICATIONS

Combined Search and Examination Report under Sections 17 and 18(3), dated Nov. 11, 2024, GB Patent Application No. GB2411090.0.
U.S. Appl. No. 19/278,176, filed Jul. 23, 2025.
U.S. Appl. No. 19/311,515, filed Aug. 27, 2025.
U.S. Appl. No. 18/918,815, filed Oct. 17, 2024.
U.S. Appl. No. 18/918,807, filed Oct. 17, 2024.
U.S. Appl. No. 18/999,926, filed Dec. 23, 2024.
U.S. Appl. No. 19/377,545, filed Nov. 3, 2025.

* cited by examiner

*Primary Examiner* — Jacinta M Crawford
(74) *Attorney, Agent, or Firm* — Pearl Cohen Zedek Latzer Baratz LLP

(57) ABSTRACT

A graphics processing system that is operable to perform ray tracing using micromaps is disclosed. A tree representation of a micromap is generated, and when it is desired to determine whether and/or how a ray interacts with a sub-region of a primitive, the tree representation of the micromap is traversed to determine a property value for the sub-region of the primitive.

17 Claims, 15 Drawing Sheets

1101

| 1 | 0 | 0 | 0 | 1 | 0 | 0 | 0 | 0 |

1102

| 1 | 0 | 0 | 0 | 1 | 0 | 2 |

| Tree | 0b0_0001_0001 |
|------|----------------|
| Data | 0b10_0001_0000_0001 |

| Fully transparent | 00 |
| --- | --- |
| Fully opaque | 01 |
| Unknown | 10 |
| Internal node | 11 |

RAY TRACING GRAPHICS PROCESSING USING MICROMAPS

BACKGROUND

The technology described herein relates to graphics processing systems, and in particular to the rendering of frames (images) for display using ray tracing.

FIG. 1 shows an exemplary system on-chip (SoC) graphics processing system 8 that comprises a host processor in the form of a central processing unit (CPU) 1, a graphics processor (GPU) 2, a display processor 3 and a memory controller 5.

As shown in FIG. 1, these units communicate via an interconnect 4 and have access to off-chip memory 6. In this system, the graphics processor 2 will render frames (images) to be displayed, and the display processor 3 will then provide the frames to a display panel 7 for display.

In use of this system, an application 13 such as a game, executing on the host processor (CPU) 1 will, for example, require the display of frames on the display panel 7. To do this, the application will submit appropriate commands and data to a driver 11 for the graphics processor 2 that is executing on the CPU 1. The driver 11 will then generate appropriate commands and data to cause the graphics processor 2 to render appropriate frames for display and to store those frames in appropriate frame buffers, e.g. in the main memory 6. The display processor 3 will then read those frames into a buffer for the display from where they are then read out and displayed on the display panel 7 of the display.

One rendering process that may be performed by a graphics processor is so-called "ray tracing". Ray tracing is a rendering process which involves tracing the paths of rays of light from a viewpoint (sometimes referred to as a "camera") back through sampling positions in an image plane into a scene, and simulating the effect of the interaction between the rays and objects in the scene. The output data value for a sampling position in the image (plane) is determined based on the object(s) in the scene intersected by the ray passing through the sampling position, and the properties of the surfaces of those objects. The ray tracing calculation is complex, and involves determining, for each sampling position, a set of zero or more objects within the scene which a ray passing through the sampling position intersects.

FIG. 2 illustrates an exemplary "full" ray tracing process. A ray 20 (the "primary ray") is cast backward from a viewpoint 21 (e.g. camera position) through a sampling position 22 in an image plane (frame) 23 into the scene that is being rendered. The point 24 at which the ray 20 first intersects an object in the scene is identified. This first intersection will be with the object in the scene closest to the sampling position. In this example, the first intersected object is represented by a set (e.g. mesh) of triangle primitives, and the ray 20 is found to intersect a triangle primitive 25 representing the object. A secondary ray in the form of shadow ray 26 may be cast from the first intersection point 24 to a light source 27. Depending upon the material of the surface of the object, another secondary ray in the form of reflected ray 28 may be traced from the intersection point 24. If the object is, at least to some degree, transparent, then a refracted secondary ray may be considered.

Ray tracing is considered to provide better, e.g. more realistic, physically accurate images than more traditional rasterisation rendering techniques, particularly in terms of the ability to capture reflection, refraction, shadows and lighting effects. However, ray tracing can be significantly more processing-intensive than traditional rasterisation, and so it is usually desirable to be able to accelerate ray tracing.

One way of accelerating ray tracing is the use of so-called "micromaps". In such techniques, a primitive is sub-divided into a "micromesh" comprising equally sized and shaped "sub-primitives", and a property (e.g. opacity) value is stored for each such sub-primitive. The use of micromaps allows fine detail to be more efficiently encoded and processed, e.g. as compared to more traditional texture-based approaches.

The inventor believes that there remains scope for improved techniques for performing ray tracing using a graphics processor.

BRIEF DESCRIPTION OF THE DRAWINGS

Embodiments of the technology described herein will now be described by way of example only and with reference to the accompanying drawings, in which:

FIG. 11A and FIG. 11B illustrate a succinct encoding of the tree representation of FIG. 10B in accordance with an embodiment;

Like reference numerals are used for like components where appropriate in the drawings.

DETAILED DESCRIPTION

Figure 1:
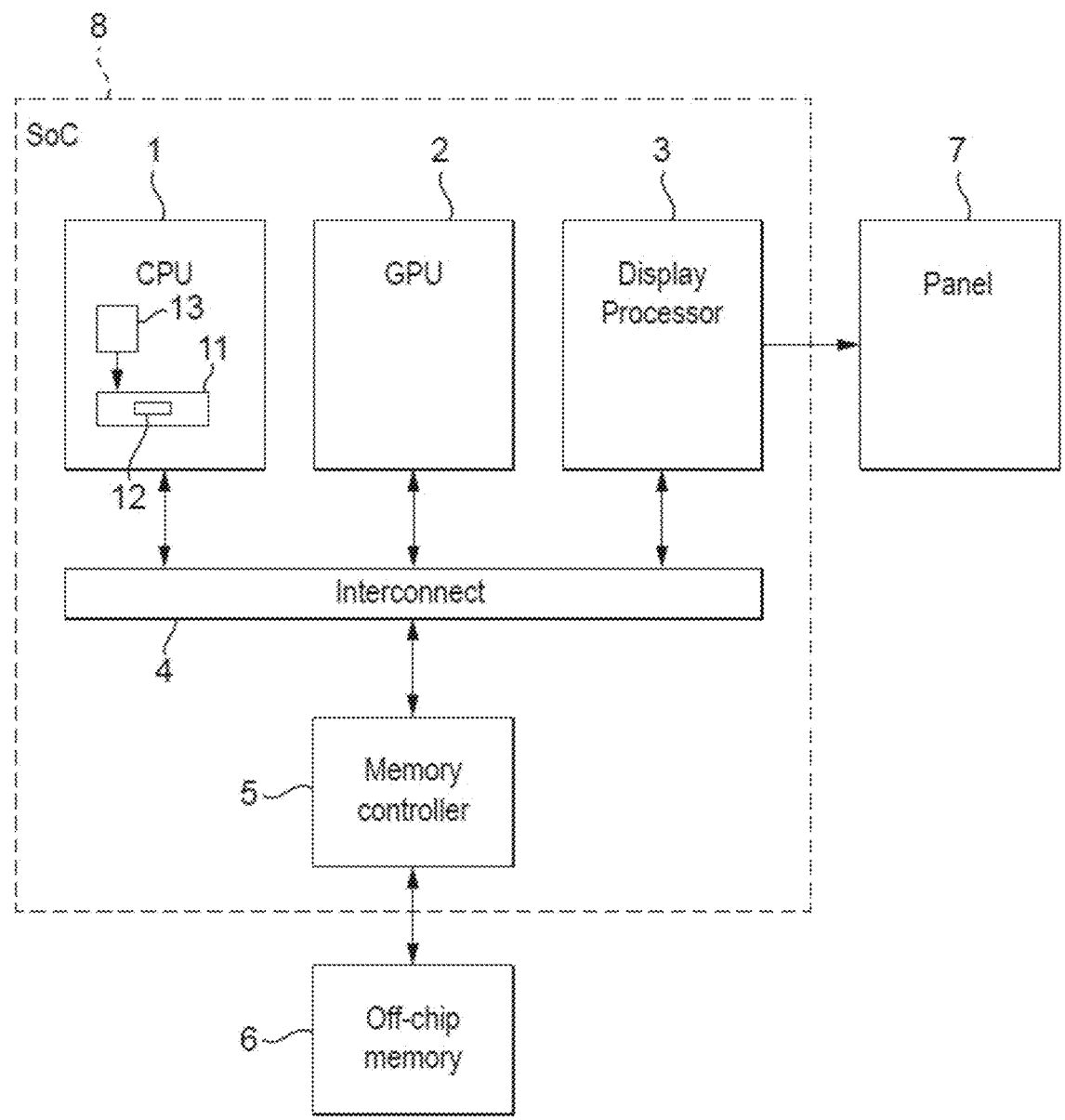
FIG. 1 shows an exemplary graphics processing system.

A first embodiment of the technology described herein comprises a method of operating a graphics processing system that is operable to render a scene represented by primitives by tracing rays through the scene and controlling interactions between rays and sub-regions of primitives using property values defined by one or more micromaps, wherein a micromap defines property values for plural sub-regions of a primitive;

the method comprising:
providing a micromap that defines property values for sub-regions of a primitive of a scene to be rendered; and
generating a tree representation of the micromap;

the method further comprising rendering the scene by tracing rays through the scene, and when it is desired to determine whether and/or how a ray and a sub-region of the primitive interact:
  traversing the tree representation of the micromap to determine a property value for the sub-region of the primitive; and
  using the determined property value to determine whether and/or how the ray and the sub-region of the primitive interact.

A second embodiment of the technology described herein comprises a graphics processing system that is operable to render a scene represented by primitives by tracing rays through the scene and controlling interactions between rays and sub-regions of primitives using property values defined by one or more micromaps, wherein a micromap defines property values for plural sub-regions of a primitive; the graphics processing system comprising:
  a tree representation generating circuit configured to generate a tree representation of a micromap that defines property values for sub-regions of a primitive of a scene to be rendered; and
  a rendering circuit configured to render a scene by tracing rays through a scene, and when it is desired to determine whether and/or how a ray and a sub-region of a primitive interact:
    traverse a tree representation of a micromap generated by the tree representation generating circuit to determine a property value for the sub-region of the primitive; and
    use the determined property value to determine whether and/or how the ray and the sub-region of the primitive interact.

The technology described herein relates to a graphics processing system in which property values for sub-regions of primitives can be defined by micromaps. As discussed above, and in embodiments, a micromap effectively subdivides a primitive into plural equally sized and shaped sub-regions ("sub-primitives"), and defines a property value for each such sub-region.

In the technology described herein, a property value defined for a sub-region of a primitive by a micromap is used during ray tracing to determine whether and/or how a ray interacts with the sub-region of the primitive. For example, and in embodiments, an opacity value defined by an opacity micromap is used to determine whether or not a sub-region of a primitive is opaque, and thus whether or not a ray should e.g. pass through the primitive sub-region.

In the technology described herein, a tree representation of a micromap is generated, and a property value for a primitive sub-region is determined by traversing the tree representation of the micromap (e.g. in contrast to determining a property value for a primitive sub-region by directly sampling a micromap).

As will be discussed in more detail below, the inventor has recognised that it is possible to represent a micromap as a tree, and that this can reduce the number of property values that would otherwise need to be stored to represent the micromap. For example, and in embodiments, where plural (e.g. adjacent) sub-regions of a micromap share the same property value, a node of a tree may store (only) a single property value representing all of those sub-regions, e.g. rather than plural identical property values for the plural sub-regions being stored separately. As will be discussed further below, the inventor has further recognised a tree representation of a micromap can be succinctly encoded. Thus, representing a micromap as a tree can reduce the amount of storage required to store a micromap, thereby reducing memory bandwidth requirements. Equally, the technology described herein can increase the amount of detail representable by a micromap stored in a given amount of storage space. This can lead to a reduced number of shader calls when performing ray tracing, thereby improving ray tracing performance.

It will be appreciated, therefore, that the technology described herein can provide an improved graphics processing system and ray tracing method.

The graphics processing system should, and in embodiments does, comprise a graphics processor (GPU). The graphics processing system may further comprise a host processor, e.g. a central processing unit (CPU). The host processor (e.g. CPU) may execute applications that can require graphics processing by the graphics processor (GPU), and send appropriate commands and data to the graphics processor (GPU) to control it to perform graphics processing operations and to produce graphics processing (render) output required by applications executing on the host processor (CPU).

To facilitate this, the host processor (CPU) in embodiments also executes a driver for the graphics processor (GPU). Thus, in embodiments, the graphics processing system comprises a graphics processor (GPU) that is in communication with a host microprocessor (CPU) that executes a driver for the graphics processor (GPU).

A (each) operation of the technology described herein may be performed by the graphics processor (GPU), and/or host processor (CPU), and/or another component of the graphics processing system, as appropriate. Correspondingly, a (each) circuit of the technology described herein may form part of the graphics processor (GPU), and/or host processor (CPU), and/or another component of the graphics processing system, as appropriate.

For example, a micromap may be provided in any suitable and desired manner. In embodiments, a micromap is provided (e.g. defined) by an application, e.g. executing on the host processor (CPU). In embodiments, a micromap (defined by an application) is provided to the graphics processor (GPU), e.g. by the driver executing on the host processor (CPU).

Similarly, a tree representation of a micromap may be generated by the graphics processor (GPU) processing a micromap (that has been provided to it). Alternatively, a tree representation of a micromap may be generated by (e.g. an application or the driver executing on) the host processor (CPU) or another data processor of a data processing system (and the generated tree representation then provided to the graphics processor (GPU)). Thus, the tree representation generating circuit may be part of the graphics processor (GPU) and/or host processor (CPU), e.g. the driver, and/or another data processor.

In embodiments, (at least) rendering of a scene, traversal of a tree representation and determination of ray-primitive interactions is performed by a (the) graphics processor (GPU). Thus, in embodiments, (at least) the rendering circuit is part of a (the) graphics processor (GPU).

Thus, another embodiment of the technology described herein comprises a method of operating a graphics processor that is operable to render a scene represented by primitives by tracing rays through the scene and controlling interactions between rays and sub-regions of primitives using property values defined by one or more micromaps, wherein a micromap defines property values for plural sub-regions of a primitive;

the method comprising rendering a scene represented by primitives by tracing rays through the scene, and when it is desired to determine whether and/or how a ray and a sub-region of a primitive interact:

determining, by traversing a tree representation of a micromap that defines property values for sub-regions of the primitive, a property value for the sub-region of the primitive; and using the determined property value to determine whether and/or how the ray and the sub-region of the primitive interact.

Another embodiment of the technology described herein comprises a graphics processor that is operable to render a scene represented by primitives by tracing rays through the scene and controlling interactions between rays and sub-regions of primitives using property values defined by one or more micromaps, wherein a micromap defines property values for plural sub-regions of a primitive; the graphics processor comprising:

a rendering circuit configured to render a scene represented by primitives by tracing rays through the scene; and a processing circuit configured to, when it is desired to determine whether and/or how a ray and a sub-region of a primitive interact:

determine, by traversing a tree representation of a micromap that defines property values for sub-regions of the primitive, a property value for the sub-region of the primitive; and use the determined property value to determine whether and/or how the ray and the sub-region of the primitive interact.

The rendering circuit and the processing circuit may comprise separate circuits, or may be at least partially formed of shared processing circuits. For example, the rendering circuit may comprise the processing circuit.

These embodiments can, and in embodiments do, include any one or more or all of the optional features described herein, as appropriate. For example, the graphics processor may (comprise a (the) tree representation generating circuit configured to) generate the tree representation of the micromap. Alternatively, the graphics processor may (comprise a tree representation receiving circuit configured to) receive the tree representation of the micromap, e.g. from the (driver executing on the) host processor (CPU).

In embodiments of the technology described herein, the graphics processing system/processor is operable to perform ray tracing, e.g. and in embodiments, in order to generate a render output, such as a frame for display, e.g. that represents a view of a scene comprising one or more objects. The graphics processing system/processor may typically generate plural render outputs, e.g. a series of frames.

A render output will typically comprise an array of data elements (sampling points) (e.g. pixels), for each of which appropriate render output data (e.g. a set of colour value data) is generated by the graphics processing system/processor. A render output data may comprise colour data, for example, a set of red, green and blue, RGB values and a transparency (alpha, a) value.

The graphics processing system/processor may carry out ray tracing graphics processing operations in any suitable and desired manner. The graphics processing system/processor may comprise one or more programmable execution units (e.g. shader cores) operable to execute programs to perform graphics processing operations, and ray-tracing based rendering may be triggered and performed by a programmable execution unit of the graphics processing system/processor executing a graphics processing (e.g. shader) program that causes the programmable execution unit to perform ray tracing rendering processes.

In embodiments, the graphics processing system/processor (comprises a ray tracing circuit that) is operable to perform ray tracing by traversing a ray tracing acceleration data structure. The ray tracing acceleration data structure may comprise a tree structure that refers to, or incorporates, a tree representation of a micromap as described herein. Thus, in embodiments, a tree representation of a micromap is part of a ray tracing acceleration data structure.

A (the) ray tracing acceleration data structure may be generated by the same graphics processor that then traverses the ray tracing acceleration data. Alternatively, a (the) ray tracing acceleration data structure may be generated by a different data processor to the graphics processor that traverses the ray tracing acceleration data. For example, a ray tracing acceleration data structure may be generated the host processor, e.g. CPU, or another processor, of a data processing system. Generation of a tree representation of a micromap may be performed as part of, or separately to, generation of the ray tracing acceleration data structure.

In embodiments, the ray tracing acceleration data structure comprises a plurality of nodes, with each node of the ray tracing acceleration data structure representing a respective volume of a scene to be rendered, and at least some of the nodes being associated with one or more primitives that fall within the respective volume (and for which a micromap may define property values). In embodiments, the ray tracing acceleration data structure is arranged as a hierarchy of nodes representing a hierarchy of volumes, e.g. and in embodiments, the ray tracing acceleration data structure comprises one or more bounding volume hierarchies (BVHs). In embodiments, the ray tracing acceleration data structure comprises end (e.g. leaf) nodes that are each associated with (represent) a set of one or more primitives defined within the respective volume that the end (e.g. leaf) node corresponds to.

In embodiments, the graphics processing system/processor (comprises a ray-volume intersection testing circuit that) is operable to test rays for intersection with volumes that are represented by the nodes of the ray tracing acceleration data structure (e.g. BVH). When a ray is found to intersect a node that is associated with one or more primitives, e.g. when a ray is found to intersect an end (e.g. leaf) node, the ray is tested for intersection with the one or more primitives that the (e.g. end/leaf) node corresponds to (by a ray-primitive intersection testing circuit of the graphics processor).

In embodiments, when a ray is found (by the ray-primitive intersection testing circuit) to intersect a primitive that is associated with a micromap, a property (value) for a region of the primitive that the ray intersects is determined by traversing a tree representation of the micromap, and used to determine whether and/or how the ray interacts with the primitive.

Thus, in embodiments, traversal of a tree representation of a micromap is performed in response to determining that a (the) ray intersects a (the) primitive that the micromap defines properties (property values) for, and/or in response to determining that a (the) ray intersects a ray tracing acceleration data structure (e.g. BVH) volume that a (the) primitive falls within.

Thus, in embodiments, the graphics processing system/processor is operable to trace a ray by traversing a ray tracing acceleration data structure and testing the ray against volumes represented by nodes of the ray tracing acceleration data structure to determine whether the ray intersects the volumes, and when it is determined that the ray intersects a volume represented by a node of the ray tracing acceleration data structure that is associated with one or more primitives that fall within the volume that the node represents, testing the ray against the one or more primitives to determine whether the ray intersects the one or more primitives, and when it is determined that the ray intersects a primitive of the one or more primitives that is associated with a tree representation of a micromap, traverse the tree representation of the micromap to determine a property (value) for a sub-region of the primitive that the ray intersects.

A primitive which a micromap defines sub-region properties (property values) for may be any suitable (graphics) primitive, e.g. a polygon. Similarly, a (each) primitive sub-region that a micromap defines a property value for may be any suitable (e.g. two-dimensional) sub-region (sub-primitive) of a primitive that represents some but not all of the primitive (area).

The primitive sub-regions that a primitive is divided into (and which a micromap defines property values for) should be, and in embodiments are, all the same size and shape. In embodiments, the primitive sub-regions have the same shape as (but a smaller size than) the sub-divided primitive. Correspondingly, in embodiments, a primitive which a micromap defines sub-region property values for should be, and in embodiments is, a primitive that can be (recursively) sub-divided into sub-regions that have the same size and shape, and that in embodiments have the same shape as (but a smaller size than) the primitive. Thus, in embodiments, a primitive which a micromap defines sub-region property values for has a self-similar shape.

In embodiments, a primitive which a micromap defines sub-region property values for is a triangle primitive. Thus, in embodiments, a micromap defines a respective property value for each sub-triangle of plural (equal size and shape) sub-triangles of a triangle primitive. Other (e.g. self-similar) primitive shapes, such as a rectangle, may be possible.

The number of primitive sub-regions (e.g. sub-triangles) that a micromap defines property values for can be any suitable number. Primitive sub-regions could be defined by sub-dividing a primitive into a power of 2 number of sub-regions, for example. In embodiments, primitive sub-regions are defined by a "four-way" recursive sub-division of a primitive into sub-regions. Thus, in embodiments, a (e.g. triangle) primitive is sub-divided into $2^{2n}$ sub-regions (e.g. sub-triangles), where n is a positive integer. For example, and in embodiments, a triangle primitive is sub-divided into 4, 16, or 64, etc., (equally sized and shaped) sub-triangles, and a micromap defines a respective property value for each such sub-triangle.

A micromap may define property values for only one primitive, or for plural different primitives, e.g. in the (same) scene. Similarly, a primitive may have a micromap associated with it, or no micromap associated with it.

The property that a micromap defines values for can be any suitable property whose values can be used to determine an interaction between a ray and a primitive sub-region, e.g. a scalar, colour, normal, or other rendering property. In embodiments, a (each) micromap is an opacity micromap that defines opacity (e.g. "alpha") values for sub-regions of a primitive.

An opacity value can be any suitable value indicating opacity of a primitive sub-region. An opacity value could indicate a degree of opacity. In embodiments, an opacity value indicates whether or not a primitive sub-region is opaque (or whether or not a primitive sub-region is transparent).

In embodiments, an opacity value is (e.g. a one-bit value that is) one of (only) two possible values: a first value indicating that a primitive sub-region is not opaque (e.g. is transparent), and a second value indicating that a primitive sub-region is opaque (e.g. is not transparent). Other arrangements would be possible. For example, an opacity value may be (e.g. a two-bit value that is) one of (only) four possible values: e.g. a first value indicating that a primitive sub-region is (fully) transparent, a second value indicating that a primitive sub-region is (fully) opaque, a third value indicating unknown or partial transparency, and a fourth value indicating unknown or partial opacity.

A micromap can be represented by any suitable tree representation. In embodiments, a tree representation of a micromap comprises one or more nodes, e.g. arranged in a hierarchy, and including at least a "highest-level" root node that represents the whole of the micromap (i.e. all of the primitive sub-regions that the micromap defines property values for). Other nodes of the tree are, in embodiments, "lower-level" nodes that each represent a respective sub-set of some but not all of the primitive sub-regions that the micromap defines property values for. In embodiments, a (each) node of a tree representation accordingly represents a particular area or region of a primitive: e.g. the root node representing the entire primitive area, and a (each) lower-level node representing a respective (contiguous) region of some but not all of the primitive area.

A (each) node of a tree should be, and in embodiments is, either an internal ("parent") node or an end ("leaf") node. In embodiments, a (each) internal (parent) node has an associated set of lower-level "child" nodes (whereas a (each) end node does not have any child nodes). In embodiments, a (each) child node of an internal (parent) node represents a respective non-overlapping and equal-sized region of the region (area) that the internal (parent) node represents. In embodiments, a (each) end node is associated with and defines a respective property value for the region of the primitive that the end node represents.

In embodiments, the number of child nodes that an internal (parent) node has corresponds to the micromap sub-division that defines the primitive sub-regions. Thus, in embodiments, where primitive sub-regions are defined by a recursive four-way sub-division of a primitive, the tree representation is correspondingly a four-way tree, i.e. a quadtree. Thus, in embodiments, a micromap is represented by a quadtree (i.e. a tree in which a (each) internal (parent) node has (exactly) four child nodes).

A tree representation of a micromap may be a "full" tree, e.g. comprising: a highest-level internal node (i.e. the root node) that represents all of the primitive sub-regions which the micromap defines property values for; and, for each of the primitive sub-regions, a respective lowest-level end node that represents the respective primitive sub-region and defines the corresponding property value. The tree representation may further comprise one or more intermediate-level internal nodes that each represent plural but not all of the primitive sub-regions.

For example, and in embodiments, a ("full") tree representation of a micromap comprises a root node that represents all of the primitive sub-regions which the micromap defines property values for. The root node then has a set of (e.g., in the case of a quadtree, four) child nodes that each represent a respective sub-set (e.g. quarter) of the primitive sub-regions (corresponding to a respective non-overlapping and equal-sized region (e.g. quarter) of the primitive area). Each child node of the root node may then have a set of (e.g. four) child nodes that each represent a respective sub-set (e.g. quarter) of the primitive sub-regions that the child node of the root node represents (corresponding to a respective non-overlapping and equal-sized region (e.g. quarter) of the region (e.g. quarter) of the primitive area that the child node of the root node represents), and so on, down to the end nodes that each represent an individual primitive sub-region and define the corresponding micromap property value.

In embodiments, a tree representation of a micromap is a "pruned" tree, e.g. in which at least one end node of the tree represents, and defines a property value for, plural primitive sub-regions that the micromap defines property values for. In embodiments, a tree representation of a micromap is "pruned" so as to reduce (e.g. minimise) the number of end nodes that the tree representation has, and thus the number of property values defined by the tree (and thus the amount of storage required to store the tree).

A "pruned" tree may be generated in any suitable manner. In embodiments, a tree pruning process involves (the tree representation generating circuit) determining whether any lower-level end nodes can be replaced by a single higher-level end node, e.g. on account of the lower-level end nodes (all) sharing the same property value.

In embodiments, it is determined (by the tree representation generating circuit) whether all of the property values defined by a micromap for a set of primitive sub-regions that could be represented by an internal node of a tree representation share the same value (i.e. are equal). If it is determined that all of the property values defined by a micromap for a set of primitive sub-regions that could be represented by an internal node of a tree representation share the same value, then the set of primitive sub-regions is represented in the tree by (only) a single end node that defines (only) a single property value for all of the primitive sub-regions of the set, e.g. instead of the set of primitive sub-regions being represented in the tree by plural separate nodes that define identical property values.

In embodiments, a "bottom-up" tree pruning process is performed, which starts at the lowest level of a full tree representation and works upwards towards the highest level, determining at each level whether any lower-level end nodes can be replaced by a single higher-level end node. Thus, in embodiments, it is determined (by the tree representation generating circuit) whether all of the property values defined by the (e.g., in the case of a quadtree, four) child nodes of an internal node share the same value (i.e. are equal). If it is determined that all of the property values defined by the (e.g. four) child nodes of an internal node share the same value (i.e. are equal), then the (e.g. four) child nodes are discarded and the internal node is replaced by a single end node that represents, and defines a single property value for, all of the sub-regions that the child nodes represented.

In embodiments, once a tree representation of a micromap has been generated, it is stored for use. Thus, in embodiments, data representing the tree representation of the micromap is generated and stored. In embodiments, an encoding circuit encodes and stores data representing a tree representation of a micromap (generated by the tree representation generating circuit), and a corresponding decoding circuit retrieves and decodes data stored by the encoding circuit (and provides the resulting tree representation to the rendering circuit). The encoding and/decoding circuit may be part of the graphics processor (GPU) and/or host processor (CPU), e.g. the driver, or another data processor.

The graphics processor/processing system should, and in embodiments does, comprise suitable storage for storage and retrieval of data representing a tree representation of a micromap. In embodiments, the storage comprises a main memory of the graphics processing system that the host processor (CPU) and/or graphics processor (GPU) are in communication with.

The encoding can be performed in any suitable manner. In embodiments, for each node of a (e.g. pruned) tree, a piece of data indicating whether the node is an internal node or an end node is generated (by the encoding circuit), and the pieces of data are arranged (and stored) in a predetermined order that encodes the tree structure. Thus, in embodiments, each piece of node data encodes a node type, and the order of the pieces of node data encodes how the nodes are arranged in the tree. This can succinctly encode a tree representation of a micromap.

Thus, another embodiment of the technology described herein comprises a method of storing a micromap for use by a graphics processor that is operable to render a scene represented by primitives by tracing rays through the scene and controlling interactions between rays and sub-regions of primitives using property values defined by one or more micromaps, wherein a micromap defines property values for plural sub-regions of a primitive; the method comprising:
 generating a tree representation of a micromap that defines property values for sub-regions of a primitive of a scene to be rendered; and
 generating and storing data representing the tree representation of the micromap;
 wherein generating and storing data representing the tree representation of the micromap comprises:
  generating, for each node of the tree representation, a piece of data indicating a type of the respective node; and
  storing the pieces of data in an order based on the structure of the tree representation, such that the stored data encodes the structure of the tree representation.

Another embodiment of the technology described herein comprises an apparatus operable to store a micromap for use by a graphics processor that is operable to render a scene represented by primitives by tracing rays through the scene and controlling interactions between rays and sub-regions of primitives using property values defined by one or more micromaps, wherein a micromap defines property values for plural sub-regions of a primitive; the apparatus comprising:
 a tree representation generating circuit configured to generate a tree representation of a micromap that defines property values for sub-regions of a primitive of a scene to be rendered; and
 an encoding circuit configured to generate and store data representing a tree representation of a micromap generated by the tree representation generating circuit by:
  generating, for each node of the tree representation, a piece of data indicating a type of the respective node; and
  storing the pieces of data in an order based on the structure of the tree representation, such that the stored data encodes the structure of the tree representation.

These embodiments can, and in embodiments do, include any one or more or all of the optional features described herein, as appropriate. For example, the number of end nodes of the tree representation may be reduced as described above.

As discussed above, in embodiments, a node type can be either an internal node or an end node. Thus, in embodiments, a (each) piece of data indicates whether a node is an internal node or an end node.

A (each) piece of data may only indicate node type. In this case, data encoding property values that the tree representation defines may be provided separately. For example, and in embodiments, a piece of data indicating whether a node is an internal node or an end node may be a single bit: e.g. "1" encoding an internal node, and "0" encoding an end node (or vice-versa). Thus, the structure of a tree may be encoded as a string of bits having one bit per tree node. In this case, data encoding property values that end nodes of the tree define may be provided separately, e.g. as a separate string of bits, e.g. in a corresponding order. Strings of bits encoding tree structure and end node property values may be stored separately, or together, e.g. concatenated or interleaved.

Alternatively, as well as encoding node types, the pieces of data may encode property values. Thus, in embodiments, generating and storing data representing a tree representation of a micromap comprises (the encoding circuit): generating, for each node of the tree representation, a piece of data indicating a type of the respective node and any property value that the respective node defines; and storing the pieces of data in an order based on the structure of the tree representation, such that the stored data encodes the structure of the tree representation and the property values that the tree representation defines.

In embodiments, a (each) piece of data indicates that a node is an internal node or indicates an end node property value. Thus, in embodiments, generating and storing data representing a tree representation of a micromap comprises (the encoding circuit): generating, for each node of the tree representation, a piece of data indicating that the respective node is an internal node or indicating an end node property value; and storing the pieces of data in an order based on the structure of the tree representation, such that the stored data encodes the structure of the tree representation and the property values that the end nodes of the tree representation define. This can succinctly encode the tree structure and property values together.

In these embodiments, a piece of node data may comprise sufficient bits to be able to distinguish between an internal node and each possible end node property value. For example, in the case of a property (e.g. opacity) value being one of (only) two possible values (e.g. as described above), a (each) piece of node data may have two bits so as to be able to distinguish between three possibilities: (i) an internal node; (ii) an end node having a first value; and (iii) an end node having a second value.

In the case of a property (e.g. opacity) value being one of (only) four possible values (e.g. as described above), a (each) piece of node data may have three bits so as to be able to distinguish between five possibilities: (i) an internal node; (ii) an end node having a first value; (iii) an end node having a second value; (iv) an end node having a third value; and (v) an end node having a fourth value, etc.

However, the inventor has recognised that e.g. in the case of using opacity micromaps, it may not be necessary to be able to distinguish between unknown or partial transparency and opacity values. Accordingly, it may only be necessary to distinguish between three possible opacity values: e.g. a first value indicating (fully) transparent, a second value indicating (fully) opaque, and a third value indicating unknown or partial transparency or opacity. Thus, in embodiments, a (each) piece of node data has (a size of) (only) two bits, e.g. to distinguish between four possibilities: (i) an internal node; (ii) an end node having a first value; (iii) an end node having a second value; and (iv) an end node having a third value. Thus, in these embodiments, a tree representation of an opacity micromap may be succinctly encoded (by the encoding circuit) as a string of bits having (only) two bits per tree node.

In embodiments, after a tree representation of a micromap has been encoded and stored (by the encoding circuit), it may be retrieved and appropriately decoded (by the decoding circuit) for use when performing ray tracing. In embodiments, this involves (the decoding circuit) retrieving stored pieces of data, and determining a tree structure (and, in embodiments, property values) by interpreting the stored pieces of data based on the (predetermined) order in which the pieces of data were stored.

Thus, in embodiments, stored pieces of data are retrieved; and it is determined, from each retrieved piece of data, whether a node that the respective piece of data represents is an internal node or an end node; and a structure of the tree representation is determined from an order in which the pieces of data are stored.

Thus, another embodiment of the technology described herein comprises a method of operating a graphics processor or graphics processing system that is operable to render a scene represented by primitives by tracing rays through the scene and controlling interactions between rays and sub-regions of primitives using property values defined by one or more micromaps, wherein a micromap defines property values for plural sub-regions of a primitive; the method comprising:
 retrieving stored pieces of data that encode a tree representation of a micromap that defines property values for sub-regions of a primitive of a scene to be rendered;
 determining, from each piece of data, a type of node of the tree representation that the respective piece of data encodes;
 determining, from an order in which the pieces of data are stored, a structure of the tree representation; and
 traversing the tree representation of the micromap based on the determined tree structure to determine a property value for a sub-region of the primitive.

Another embodiment of the technology described herein comprises a graphics processor or graphics processing system that is operable to render a scene represented by primitives by tracing rays through the scene and controlling interactions between rays and sub-regions of primitives using property values defined by one or more micromaps, wherein a micromap defines property values for plural sub-regions of a primitive; the graphics processor or graphics processing system comprising:
 a decoding circuit configured to:
  retrieve stored pieces of data that encode a tree representation of a micromap that defines property values for sub-regions of a primitive of a scene to be rendered;
  determine, from each piece of data, a type of node of the tree representation that the respective piece of data encodes; and
  determine, from an order in which the pieces of data are stored, a structure of the tree representation; and
 a rendering circuit configured to traverse a tree representation of a micromap based on a tree structure determined by the processing circuit to determine a property value for a sub-region of a primitive.

These embodiments can, and in embodiments do, include any one or more or all of the optional features described herein, as appropriate. For example, and in embodiments, a determined property value is used to determine whether and/or how a ray and a sub-region of a primitive interact.

In embodiments in which property values are stored separately to tree structure encoding data, a property value may be determined from (separate) data encoding the property values. In embodiments in which tree structure and property values are encoded together, property values may be determined from the pieces of data that (also) encode the tree structure. Thus, for each piece of data, a type of node and any property value that the respective piece of data encodes may be determined (by the decoding circuit) from the respective piece of data. In embodiments, for each piece of data, it is determined from the respective piece of data that the corresponding node is an internal node or an end node property value is determined from the respective piece of data.

The (predetermined) order in which pieces of data are stored to encode tree structure can be any suitable order that is used both when encoding and decoding a tree representation. In embodiments, encoding a tree representation involves (the encoding circuit) traversing the tree representation in a tree traversal order, and storing pieces of data in an order corresponding to the tree traversal order. Correspondingly, in embodiments, decoding a tree representation involves (the decoding circuit) determining a tree structure by interpreting stored pieces of data based on knowledge that the pieces of data are stored in an order corresponding to a tree traversal order. In embodiments, the (predetermined) order follows a breadth first, depth first, or other tree traversal order.

In embodiments, after a tree representation of a micromap has been retrieved and decoded, it is traversed in order to determine a property value. A tree representation of a micromap can be traversed to determine a property value in any suitable manner.

In embodiments, a property value is determined from a tree representation of a micromap by traversing the tree representation starting at the root node, to an end node that represents a region of a primitive intersected by a ray. In embodiments, at each internal node, the child node of the internal node that represents a region of the primitive that the ray intersects is traversed to.

In embodiments, once an end node is reached, the property value defined by the end node is used (by the rendering circuit) to determine a ray-primitive interaction.

For example, and in embodiments, in the case of an opacity micromap, an opacity value may be used to determine whether or not a ray should pass through the primitive and/or whether or not a ray should reflect from the primitive and/or whether or not a ray should be refracted by the primitive. In embodiments, if a determined property value indicates that a primitive sub-region is opaque, (the current) ray tracing acceleration data structure traversal for the ray may terminate, e.g. with the (current) closest hit being determined. In embodiments, if a determined property value indicates that a primitive sub-region is transparent, (the current) ray tracing acceleration data structure traversal for the ray may continue (e.g. without a (current) closest hit being determined). In embodiments, if a determined property value indicates that a primitive sub-region has unknown or partial transparency or opacity, execution of a shader program may be triggered in order to determine whether and/or how a ray interacts with the primitive sub-region.

Each and every micromap may be represented and stored as a tree representation. However, the inventor has realised that it may not always be advantageous to store a micromap as a tree representation. For example, a micromap that defines property values that are all different may only be representable as a "full" tree, such that storage and/or processing requirements may be greater for the tree representation than for the original micromap. In such cases, in embodiments, a micromap may be stored and processed in its original form.

Thus, in embodiments, it is determined whether representing a micromap as a tree representation is associated with a decrease in processing and/or storage requirements. In embodiments, when it is determined that representing a micromap as a tree representation is associated with a decrease in processing and/or storage requirements, the tree representation of the micromap is generated, stored and traversed (e.g. as described above). In embodiments, when it is not determined that representing a micromap as a tree representation is associated with a decrease in processing and/or storage requirements (e.g. when it is determined that representing a micromap as a tree representation is associated with an increase in processing and/or storage requirements), the micromap is stored and processed (in its original form).

Thus, in embodiments, when it is determined that representing a micromap as a tree representation is associated with an increase in processing and/or storage requirements, a property value for a sub-region of a primitive is determined (directly) from the micromap, and the determined property value used (by the rendering circuit) to determine an interaction between a ray and the sub-region of the primitive.

Each embodiment of the technology described herein can, and in embodiments does, include one or more, and in embodiments all, features of other embodiments of the technology described herein, as appropriate.

The technology described herein can be implemented in any suitable system, such as a suitably configured microprocessor based system. In embodiments, the technology described herein is implemented in a computer and/or micro-processor based system. The technology described herein is in embodiments implemented in a portable device, such as, and in embodiments, a mobile phone or tablet.

The technology described herein is applicable to any suitable form or configuration of graphics processor and graphics processing system, such as graphics processors (and systems) having a "pipelined" arrangement (in which case the graphics processor executes a rendering pipeline).

In embodiments, the various functions of the technology described herein are carried out on a single data processing platform that generates and outputs data, for example for a display device.

As will be appreciated by those skilled in the art, the data/graphics processing system may include, e.g., and in embodiments, a host processor that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and in embodiments does, also execute a driver for the processor and optionally a compiler or compilers for compiling (e.g. shader) programs to be executed by (e.g. an (programmable) execution unit of) the processor.

The graphics processor and/or graphics processing system may also comprise, and/or be in communication with, one or more memories and/or memory devices that store the data described herein, and/or store software (e.g. (shader) program) for performing the processes described herein. The processor and/or system may also be in communication with and/or include a host microprocessor, and/or with a display for displaying images based on data generated by the processor/system.

The technology described herein can be used for all forms of input and/or output that a graphics processor may use or generate. For example, the graphics processor may execute a graphics processing pipeline that generates frames for display, render-to-texture outputs, etc. The output data values from the processing are in embodiments exported to external, e.g. main, memory, for storage and use, such as to a frame buffer for a display.

The various functions of the technology described herein can be carried out in any desired and suitable manner. For example, the functions of the technology described herein can be implemented in hardware or software, as desired. Thus, for example, the various functional elements, stages, and "means" of the technology described herein may comprise a suitable processor or processors, controller or controllers, functional units, circuitry, circuit(s), processing logic, microprocessor arrangements, etc., that are operable to perform the various functions, etc., such as appropriately dedicated hardware elements (processing circuit(s)) and/or programmable hardware elements (processing circuit(s)) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuit(s), etc., if desired.

Furthermore, any one or more or all of the processing stages of the technology described herein may be embodied as processing stage circuitry/circuits, e.g., in the form of one or more fixed-function units (hardware) (processing circuitry/circuits), and/or in the form of programmable processing circuitry/circuits that can be programmed to perform the desired operation. Equally, any one or more of the processing stages and processing stage circuitry/circuits of the technology described herein may be provided as a separate circuit element to any one or more of the other processing stages or processing stage circuitry/circuits, and/or any one or more or all of the processing stages and processing stage circuitry/circuits may be at least partially formed of shared processing circuitry/circuits.

Subject to any hardware necessary to carry out the specific functions discussed above, the components of the graphics processing system can otherwise include any one or more or all of the usual functional units, etc., that such components include.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a data processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

The present embodiments relate to the operation of a graphics processor, e.g. in a graphics processing system as illustrated in FIG. 1, when performing rendering of a scene to be displayed using a ray tracing-based rendering process.

Ray tracing is a rendering process which involves tracing the paths of rays of light from a viewpoint (sometimes referred to as a "camera") back through sampling positions in an image plane (which is the frame being rendered) into a scene, and simulating the effect of the interaction between the rays and objects in the scene. The output data value e.g. colour of a sampling position in the image is determined based on the object(s) in the scene intersected by the ray passing through the sampling position, and the properties of the surfaces of those objects. The ray tracing process thus involves determining, for each sampling position, a set of (zero or more) objects within the scene which a ray passing through the sampling position intersects.

Figure 2:
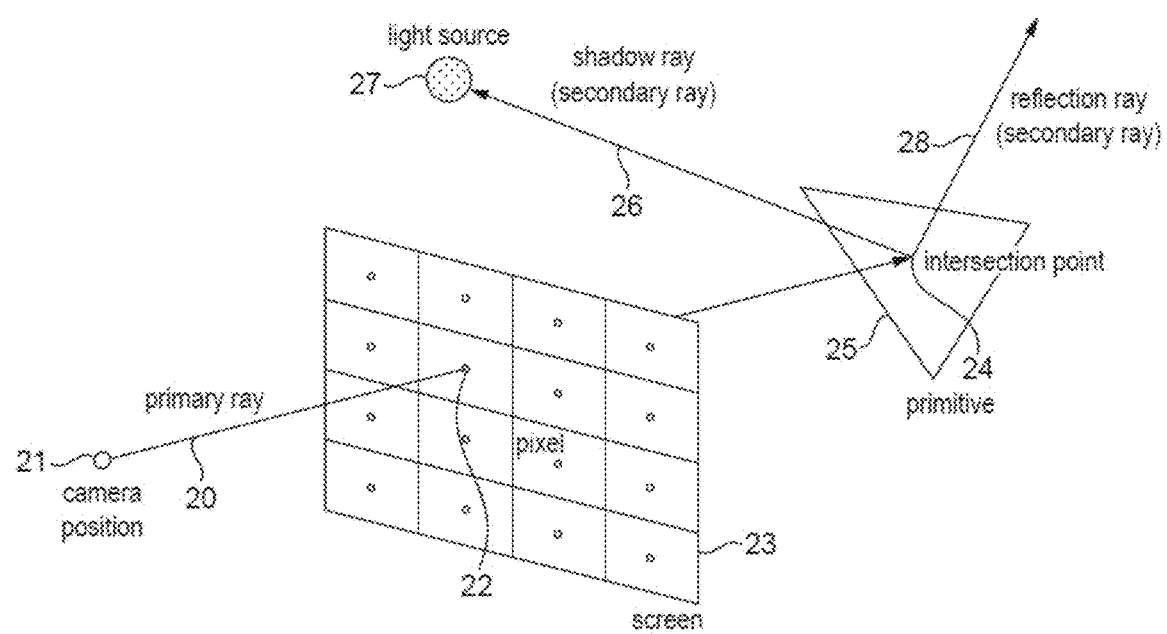
FIG. 2 is a schematic diagram illustrating a "full" ray tracing process.

FIG. 2 illustrates an exemplary "full" ray tracing process. A ray 20 (the "primary ray") is cast backward from a viewpoint 21 (e.g. camera position) through a sampling position 22 in an image plane (frame) 23 into the scene that is being rendered. The point 24 at which the ray 20 first intersects an object, which in this case is represented by a triangle primitive 25, in the scene is identified. This first intersection will be with the object in the scene closest to the sampling position.

A secondary ray in the form of shadow ray 26 may be cast from the first intersection point 24 to a light source 27. Depending upon the material of the surface of the object, another secondary ray in the form of reflected ray 28 may be traced from the intersection point 24. If the object is, at least to some degree, transparent, then a refracted secondary ray may be considered.

Such casting of secondary rays may be used where it is desired to add shadows and reflections into the image. A secondary ray may be cast in the direction of each light source (and, depending upon whether or not the light source is a point source, more than one secondary ray may be cast back to a point on the light source).

In the example shown in FIG. 2, only a single bounce of the primary ray 20 is considered, before tracing the reflected ray back to the light source. However, a higher number of bounces may be considered if desired.

The output data for the sampling position 22 i.e. a colour value (e.g. RGB value) thereof, is then determined taking into account the interactions of the primary, and any secondary, ray(s) cast, with objects in the scene. The same process is conducted in respect of each sampling position to be considered in the image plane (frame) 23.

In order to facilitate such ray tracing processing, in the present embodiments, acceleration data structures indicative of the geometry (e.g. objects) in scenes to be rendered are used when determining the intersection data for the ray(s) associated with a sampling position in the image plane to identify a subset of the geometry which a ray may intersect.

The ray tracing acceleration data structure represents and indicates the distribution of geometry (e.g. objects) in the scene being rendered, and in particular the geometry that falls within respective (sub-) volumes in the overall volume of the scene (that is being considered).

In the present embodiments, a ray tracing acceleration data structure is in the form of one or more Bounding Volume Hierarchy (BVH) trees. The use of BVH trees allows and facilitates testing a ray against a hierarchy of bounding volumes until a leaf node is found. It is then only necessary to test the geometry associated with the particular leaf node for intersection with the ray.

Figure 3A:
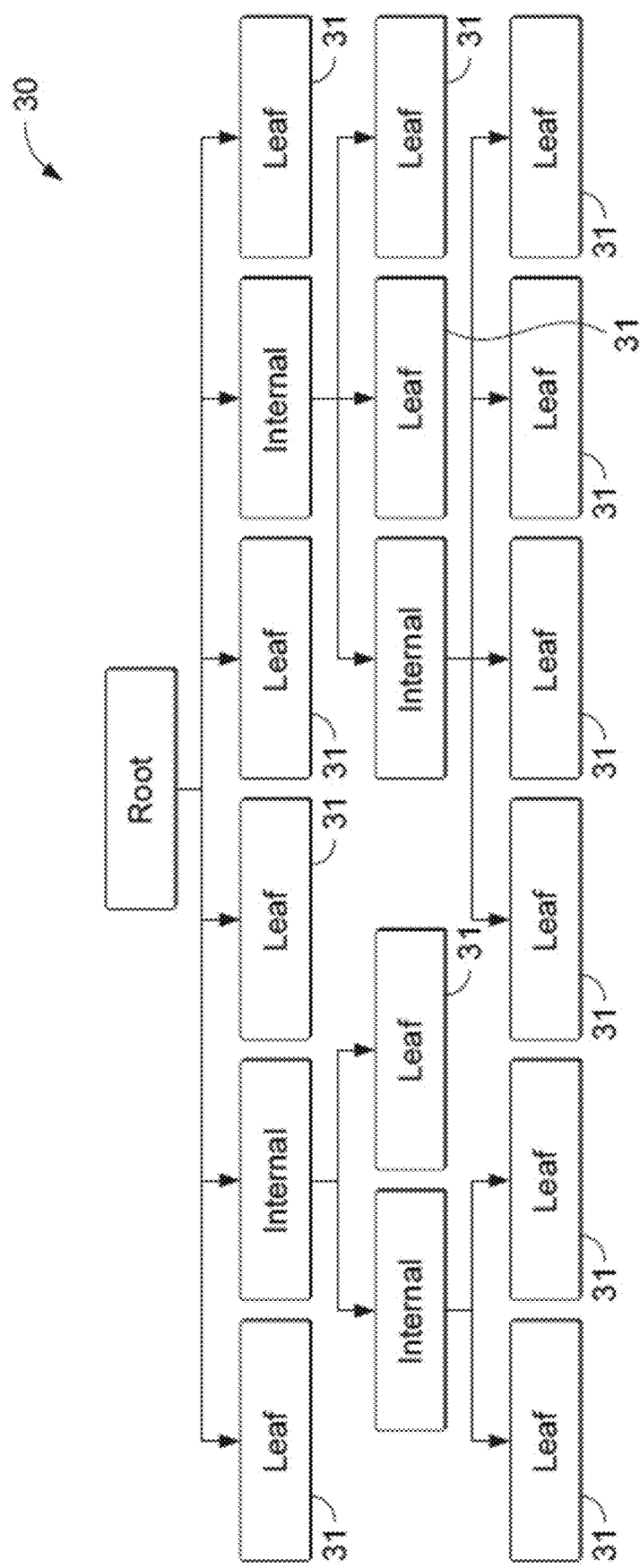
FIG. 3A and FIG. 3B show exemplary ray tracing acceleration data structures.

FIG. 3A shows an exemplary BVH tree 30, constructed by enclosing a volume in an axis-aligned bounding volume (AABV), e.g. a cube, and then recursively sub-dividing the bounding volume into successive sub-AABVs according to any suitable and desired sub-division scheme, until a desired smallest sub-division (volume) is reached.

In this example, the BVH tree 30 is a relatively "wide" tree wherein each bounding volume is sub-divided into up to six sub-AABVs. However, in general, any other suitable tree structure may be used, and a given node of the tree may have any suitable and desired number of child nodes.

Thus, each node in the BVH tree 30 will have a respective volume associated with it, with the end, leaf nodes 31 each representing a particular smallest sub-divided volume, and any parent node representing, and being associated with, the volume of its child nodes.

A complete scene may be represented by a single BVH tree, e.g. with the tree storing the geometry for the scene, e.g. in world space. In this case, each leaf node of the BVH tree 30 may be associated with the geometry defined for the scene that falls, at least in part, within the volume that the leaf node corresponds to (e.g. whose centroid falls within the volume in question). The leaf nodes 31 may represent unique (non-overlapping) subsets of primitives defined for the scene falling within the corresponding volumes for the leaf nodes 31.

Figure 3B:
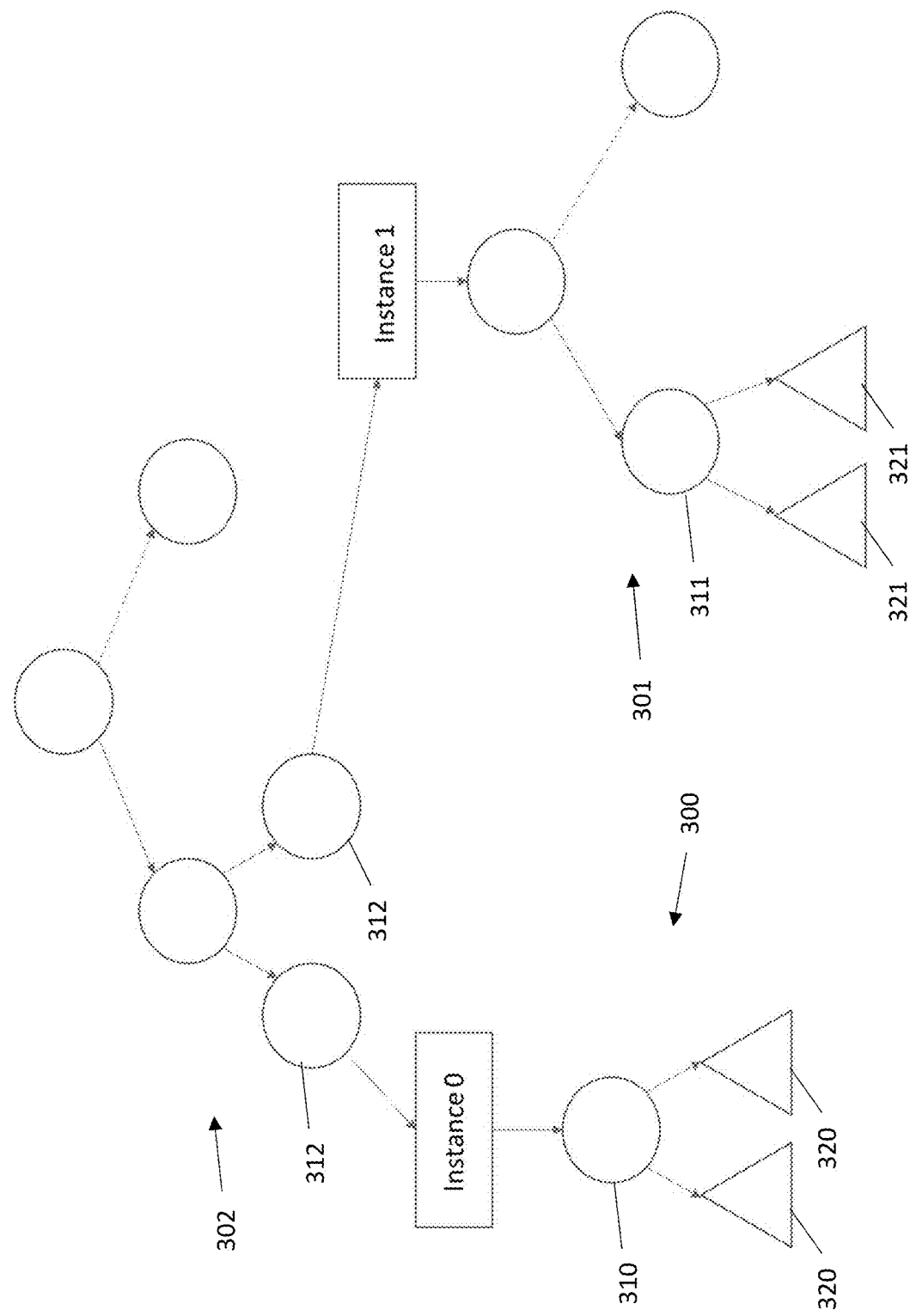

In the present embodiments, a two-level ray tracing acceleration data structure is used. FIG. 3B shows an exemplary two-level ray tracing acceleration data structure in which each instance or object is associated with a respective bottom-level acceleration structure (BLAS) 300, 301, which in the present embodiments is in the form of a respective BVH tree that stores geometry in a model space, with each leaf node 310, 311 of the BVH tree representing a unique subset of primitives 320, 321 defined for the instance or object falling within the corresponding volume.

A separate top-level acceleration structure (TLAS) 302 then contains references to the set of bottom-level acceleration structures (BLAS), together with a respective set of shading and transformation information for each bottom-level acceleration structure (BLAS). In the present embodiments, the top-level acceleration structure (TLAS) 302 is defined in a "top-level" space (e.g. world space) and is in the form of a BVH tree having leaf nodes 312 that each point to one or more of the bottom-level acceleration structures (BLAS) 300, 301.

Other forms of ray tracing acceleration data structure would be possible.

Figure 4A:
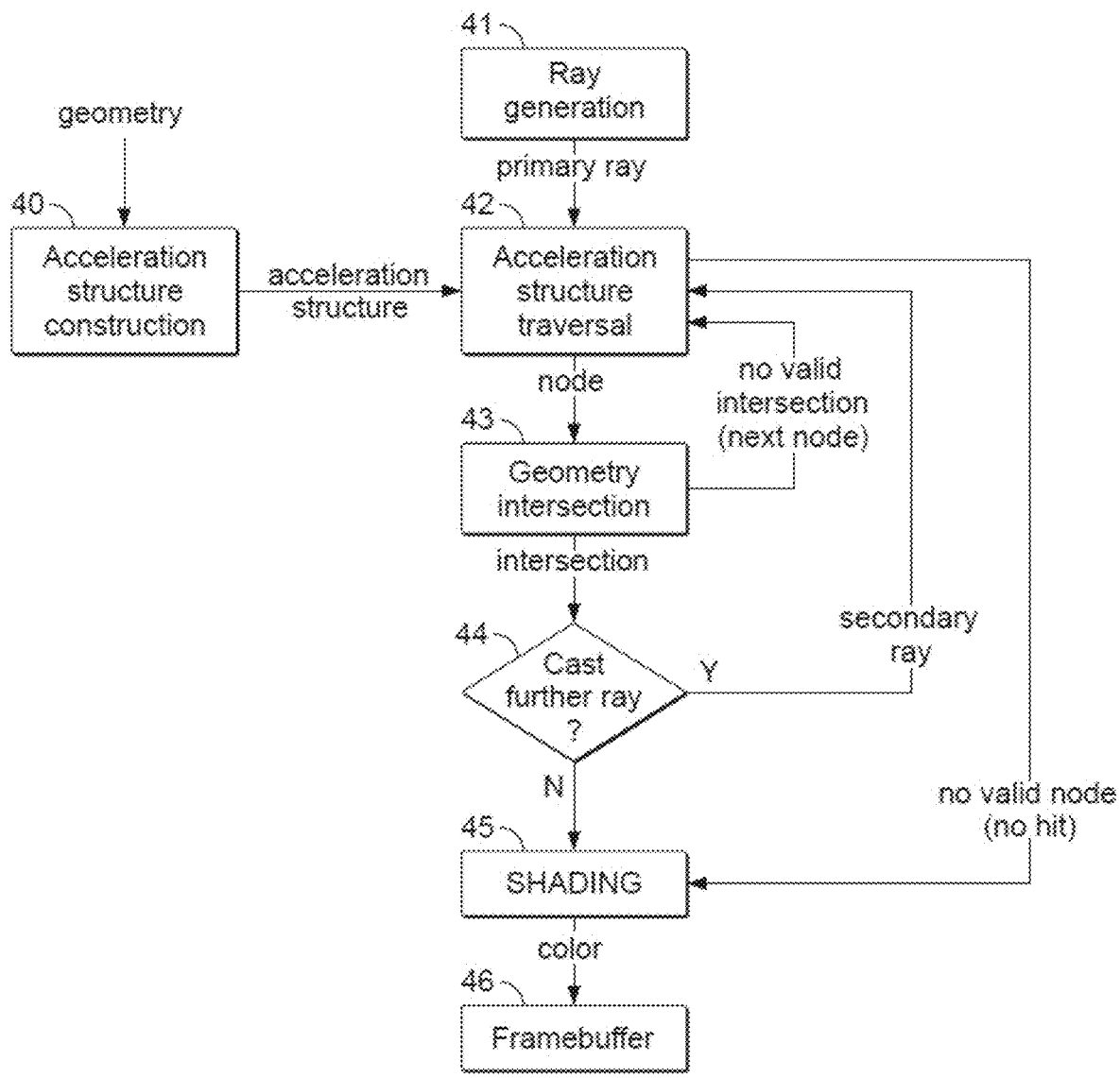
FIG. 4A and FIG. 4B are flow charts illustrating embodiments of a full ray tracing process.

FIG. 4A is a flow chart showing an overall ray tracing process that may be performed on and by the graphics processor 2.

First, the geometry of the scene is analysed and used to obtain an acceleration data structure (step 40), for example in the form of one or more BVH tree structures, as discussed above. This can be done in any suitable and desired manner, for example by means of an initial processing pass on the graphics processor 2.

A primary ray is then generated, passing from a camera through a particular sampling position in an image plane (frame) (step 41). The acceleration data structure is then traversed for the primary ray (step 42), and the leaf node corresponding to the first volume that the ray passes through which contains geometry which the ray potentially intersects is identified. It is then determined whether the ray intersects any of the geometry, e.g. primitives, (if any) in that leaf node (step 43).

If no (valid) geometry which the ray intersects can be identified in the node, the process returns to step 42, and the ray continues to traverse the acceleration data structure and the leaf node for the next volume that the ray passes through which may contain geometry with which the ray intersects is identified, and a test for intersection performed at step 43.

This is repeated for each leaf node that the ray (potentially) intersects, until geometry that the ray intersects is identified.

When geometry that the ray intersects is identified, it is then determined whether to cast any further (secondary) rays for the primary ray (and thus sampling position) in question (step 44). This may be based, e.g., and in an embodiment, on the nature of the geometry (e.g. its surface properties) that the ray has been found to intersect, and the complexity of the ray tracing process being used.

Thus, as shown in FIG. 4A, one or more secondary rays may be generated emanating from the intersection point (e.g. a shadow ray(s), a refraction ray(s) and/or a reflection ray(s), etc.). Steps 42, 43 and 44 are then performed in relation to each secondary ray.

Once there are no further rays to be cast, a shaded colour for the sampling position that the ray(s) correspond to is then determined based on the result(s) of the casting of the primary ray, and any secondary rays considered (step 45), taking into account the properties of the surface of the object at the primary intersection point, any geometry intersected by secondary rays, etc., The shaded colour for the sampling position is then stored in the frame buffer (step 46).

If no (valid) node which may include geometry intersected by a given ray (whether primary or secondary) can be identified in step 42 (and there are no further rays to be cast for the sampling position), the process moves to step 45, and shading is performed. In this case, the shading is in an embodiment based on some form of "default" shading operation that is to be performed in the case that no intersected geometry is found for a ray. This could comprise, e.g., simply allocating a default colour to the sampling position, and/or having a defined, default geometry to be used in the case where no actual geometry intersection in the scene is found, with the sampling position then being shaded in accordance with that default geometry. Other arrangements are possible.

This process is performed for each sampling position to be considered in the image plane (frame). Once the final output value for the sampling position in question has been generated, the processing in respect of that sampling position is completed. A next sampling position may then be processed in a similar manner, and so on, until all the sampling positions for the frame have been appropriately shaded. The frame may then be output, e.g. for display, and the next frame to be rendered processed in a similar manner, and so on.

Figure 4B:
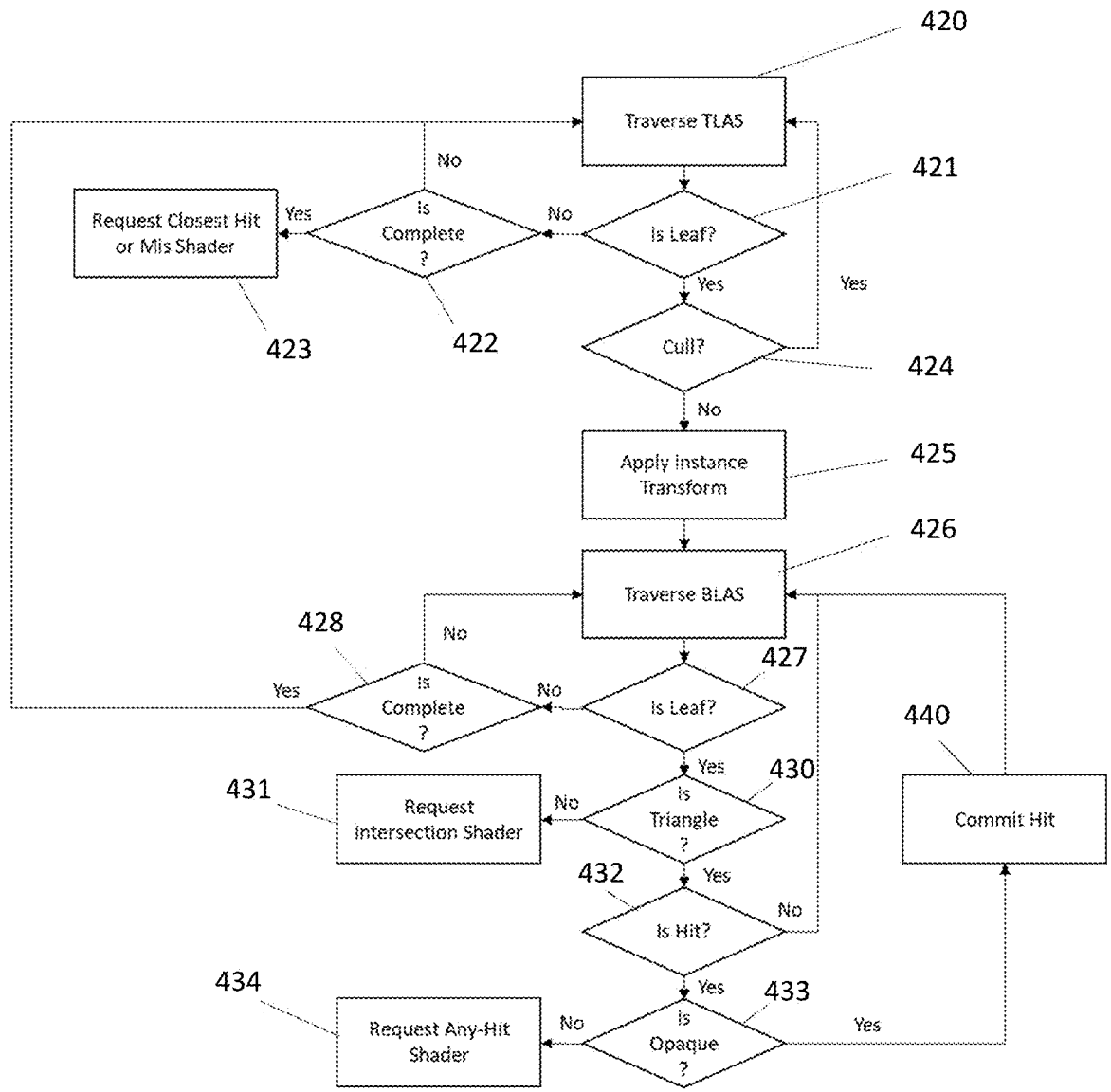

FIG. 4B is a flow chart showing in more detail acceleration structure traversal in the case of a two-level acceleration data structure, e.g. as described above with reference to FIG. 3B. As shown in FIG. 4B, in this case, acceleration structure traversal begins with TLAS traversal (step 420), and TLAS traversal continues in search of a TLAS leaf node (steps 421, 422). If no TLAS leaf node can be identified, a "default" shading operation ("miss shader") may be performed (step 423), e.g. as described above.

When (at step 421) a TLAS leaf node is identified, it is determined whether that leaf node can be culled from further processing (step 424). If it can be culled from further processing, the process returns to TLAS traversal (step 420).

If the TLAS leaf node cannot be culled from further processing, instance transform information associated with the leaf node is used to transform the ray to the appropriate space for BLAS traversal (step 425). BLAS traversal then begins (step 426), and continues in search of a BLAS leaf node (steps 427, 428). If no BLAS leaf node can be identified, the process may return to TLAS traversal (step 420).

In the present embodiments, geometry associated with a BLAS leaf node can be in the form of a set of triangle primitives or an axis aligned bounding box (AABB) primitive. When (at step 427) a BLAS leaf node is identified, it is determined whether geometry associated with the leaf node is in the form of a set of triangle primitives or an axis aligned bounding box (AABB) primitive (step 430).

As shown in FIG. 4B, when an axis aligned bounding box (AABB) primitive is encountered, execution of a shader program ("intersection shader") that defines a procedural object encompassed by the axis aligned bounding box (AABB) is triggered (step 431) to determine whether a ray intersects the procedural object defined by the shader program. On the other hand, when a set of triangle primitives is encountered, determining whether a ray intersects any of the triangle primitives is performed by fixed function circuitry (step 432). Other arrangements would be possible.

If no (valid) triangle primitives which the ray intersects can be identified in the node, the process returns to BLAS traversal (step 426).

If a ray is found to intersect a triangle primitive 25, it is determined whether or not the triangle primitive 25 is opaque at the intersection point 24 (step 433). In the case of the triangle primitive intersection point 24 being found to be non-opaque, execution of an appropriate shader program ("any-hit shader") may be triggered (step 434). Otherwise, in the case of the triangle primitive intersection point 24 being found to be opaque, the intersection can be committed without executing a shader program (step 440). Traversal for one or more secondary rays may be triggered, as appropriate, e.g. as discussed above.

Figure 5:
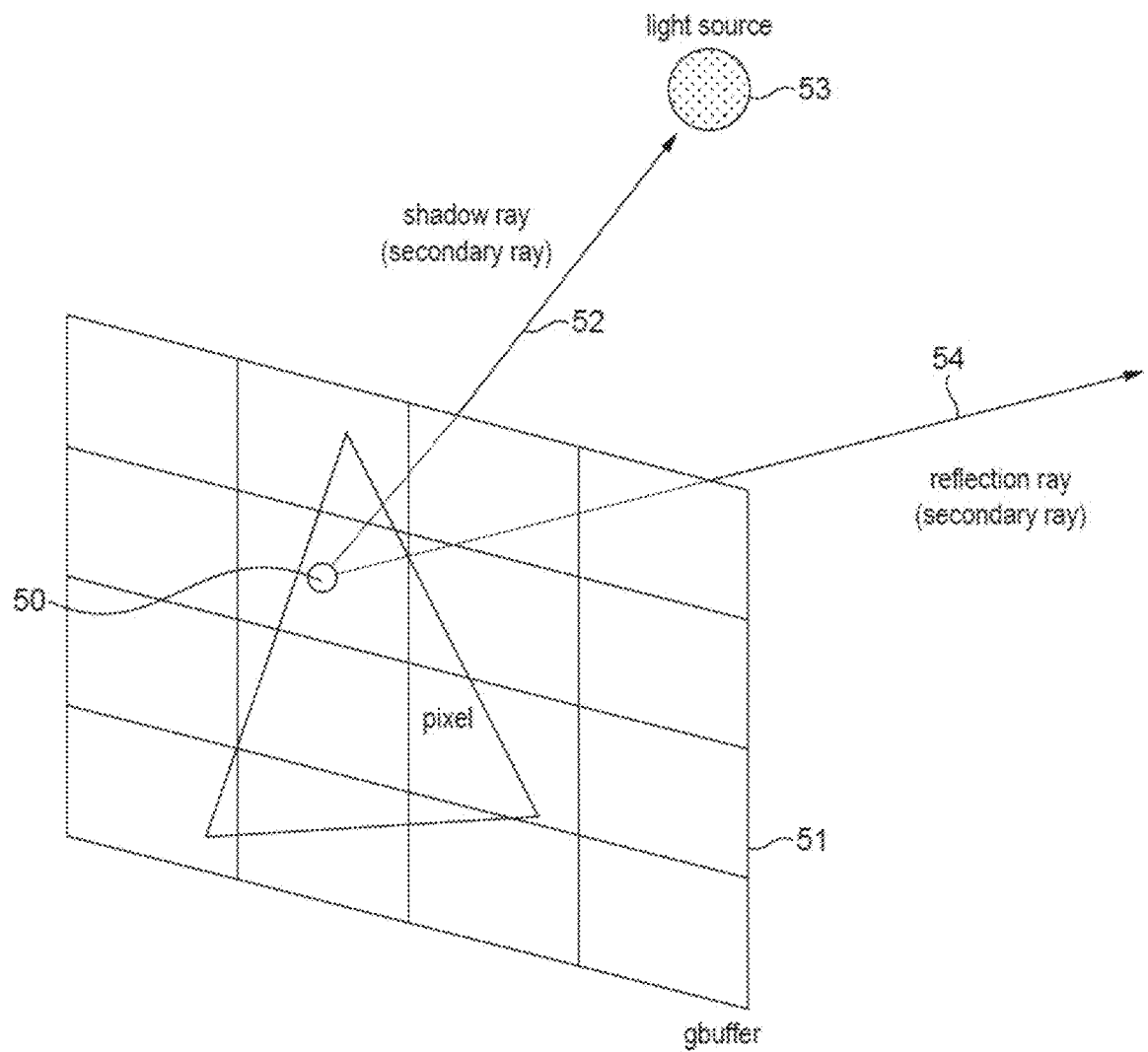
FIG. 5 is a schematic diagram illustrating a "hybrid" ray tracing process.

FIG. 5 shows an alternative ray tracing process which may be used in embodiments of the technology described herein, in which only some of the steps of the full ray tracing process described above are performed. Such an alternative ray tracing process may be referred to as a "hybrid" ray tracing process.

In this process, as shown in FIG. 5, the first intersection point 50 for each sampling position in the image plane (frame) is instead determined first using a rasterisation process and stored in an intermediate data structure known as a "G-buffer" 51. Thus, the process of generating a primary ray for each sampling position, and identifying the first intersection point of the primary ray with geometry in the scene, is replaced with an initial rasterisation process to generate the "G-buffer". The G-buffer includes information indicative of the depth, colour, normal and surface properties (and any other appropriate and desired data, e.g. albedo, etc.) for each first (closest) intersection point for each sampling position in the image plane (frame).

Secondary rays, e.g. shadow ray 52 to light source 53, and reflection ray 54, may then be cast starting from the first intersection point 50, and the shading of the sampling positions determined based on the properties of the geometry first intersected, and the interactions of the secondary rays with geometry in the scene.

Referring to the flowchart of FIG. 4A, in such a hybrid process, the initial pass of steps 41, 42 and 43 of the full ray tracing process for a primary ray will be omitted, as there is no need to cast primary rays and determine their first intersection with geometry in the scene. The first intersection point data for each sampling position is instead obtained from the G-buffer.

The process may then proceed to the shading stage 45 based on the first intersection point for each pixel obtained from the G-buffer, or where secondary rays emanating from the first intersection point are to be considered, these will need to be cast in the manner described by reference to FIG. 4. Thus, steps 42, 43 and 44 will be performed in the same manner as previously described in relation to the full ray tracing process for any secondary rays.

The colour determined for a sampling position will be written to the frame buffer in the same manner as step 46 of FIG. 4A, based on the shading colour determined for the sampling position based on the first intersection point (as obtained from the G-buffer), and, where applicable, the intersections of any secondary rays with objects in the scene, determined using ray tracing.

Figure 6:
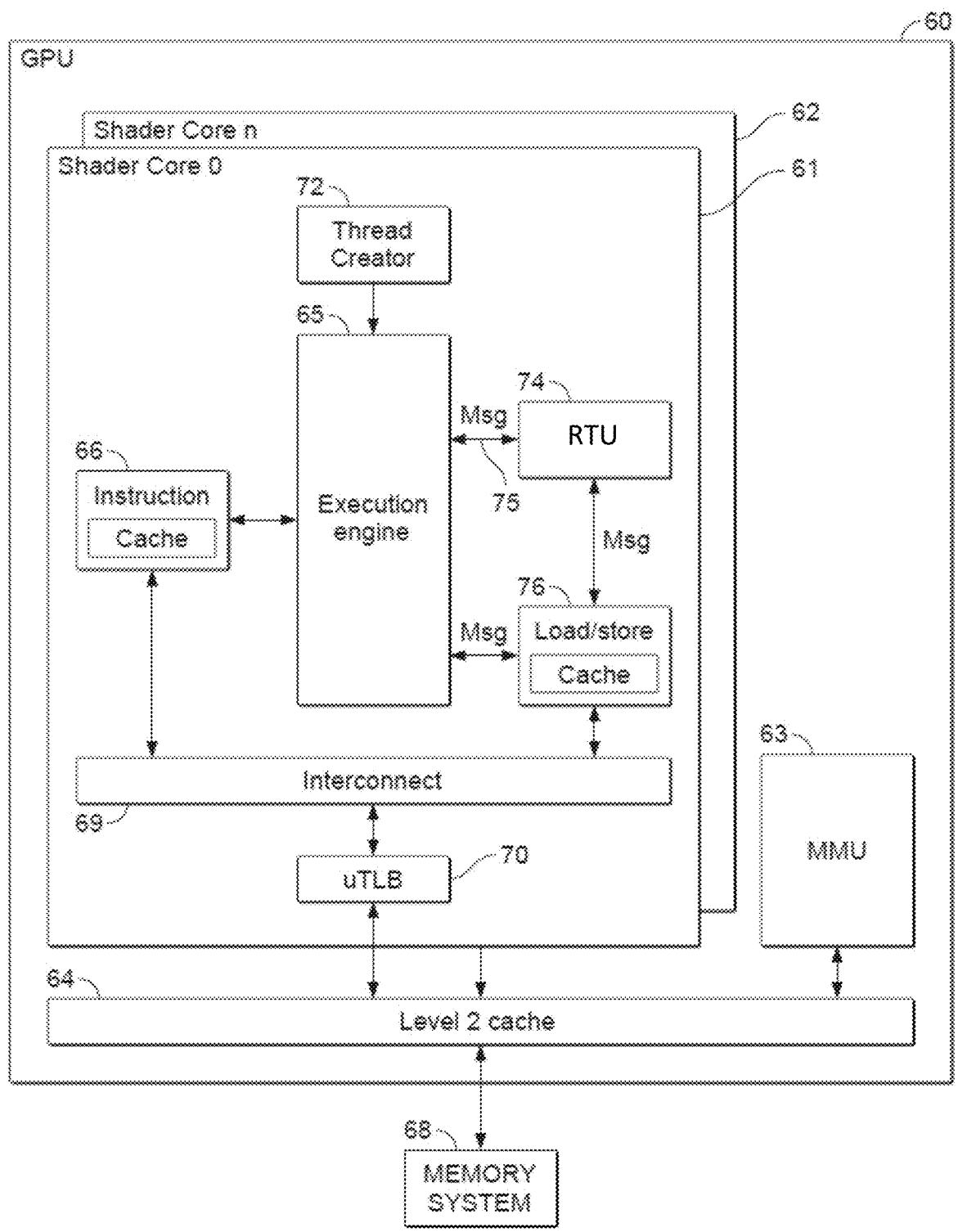
FIG. 6 shows schematically an embodiment of a graphics processor that can be operated in the manner of the technology described herein.

FIG. 6 shows schematically the relevant elements and components of a graphics processor (GPU) 2, 60 of the present embodiments.

As shown in FIG. 6, the GPU 60 includes one or more shader (processing) cores 61, 62 together with a memory management unit ("MMU") 63 and a level 2 cache 64 which is operable to communicate with an off-chip memory system 68 (e.g. via an appropriate interconnect and (dynamic) memory controller).

FIG. 6 shows schematically the relevant configuration of one shader core 61, but as will be appreciated by those skilled in the art, any further shader cores of the graphics processor 60 will be configured in a corresponding manner.

The graphics processor (GPU) shader cores 61, 62 are programmable processing units (circuits) that perform processing operations by running small programs for each "item" in an output to be generated such as a render target, e.g. frame. An "item" in this regard may be, e.g. a vertex, one or more sampling positions, etc. The shader cores will process each "item" by means of one or more execution threads which will execute the instructions of the shader program(s) in question for the "item" in question. Typically, there will be multiple execution threads each executing at the same time (in parallel).

FIG. 6 shows the main elements of the graphics processor 60 that are relevant to the operation of the present embodiments. As will be appreciated by those skilled in the art there may be other elements of the graphics processor 60 that are not illustrated in FIG. 6. It should also be noted here that FIG. 6 is only schematic, and that, for example, in practice the shown functional units may share significant hardware circuits, even though they are shown schematically as separate units in FIG. 6. It will also be appreciated that each of the elements and units, etc., of the graphics processor as shown in FIG. 6 may, unless otherwise indicated, be implemented as desired and will accordingly comprise, e.g., appropriate circuits (processing logic), etc., for performing the necessary operation and functions.

As shown in FIG. 6, each shader core of the graphics processor 60 includes an appropriate programmable execution unit (execution engine) 65 that is operable to execute graphics shader programs for execution threads to perform graphics processing operations.

The shader core 61 also includes an instruction cache 66 that stores instructions to be executed by the programmable execution unit 65 to perform graphics processing operations. The instructions to be executed will, as shown in FIG. 6, be fetched from the memory system 68 via an interconnect 69 and a micro-TLB (translation lookaside buffer) 70.

The shader core 61 also includes an appropriate load/store unit 76 in communication with the programmable execution unit 65, that is operable, e.g., to load into an appropriate cache, data, etc., to be processed by the programmable execution unit 65, and to write data back to the memory system 68 (for data loads and stores for programs executed in the programmable execution unit). Again, such data will be fetched/stored by the load/store unit 76 via the interconnect 69 and the micro-TLB 70.

In order to perform graphics processing operations, the programmable execution unit 65 will execute graphics shader programs (sequences of instructions) for respective execution threads (e.g. corresponding to respective sampling positions of a frame to be rendered). Accordingly, as shown in FIG. 6, the shader core 61 further comprises a thread creator (generator) 72 operable to generate execution threads for execution by the programmable execution unit 65.

As shown in FIG. 6, the shader core 61 in this embodiment also includes a ray tracing circuit (unit) ("RTU") 74, which is in communication with the programmable execution unit 65, and which is operable to perform the required ray-volume testing during the ray tracing acceleration data structure traversals (e.g. the operation of steps 420 and 426 of FIG. 4B) for rays being processed as part of a ray tracing-based rendering process, in response to messages 75 received from the programmable execution unit 65. In the present embodiments the RTU 74 is also operable to perform the required ray-triangle testing (e.g. the operation of step 432 of FIG. 4B). The RTU 74 is also able to communicate with the load/store unit 76 for loading in the required data for such intersection testing.

In the present embodiments, the RTU 74 of the graphics processor is a (substantially) fixed-function hardware unit (circuit) that is configured to perform the required ray-volume and ray-triangle intersection testing during a traversal of a ray tracing acceleration data structure to determine geometry for a scene to be rendered that may be (and is) intersected by a ray being used for a ray tracing operation. However, some amount of configurability may be provided.

Other arrangements would be possible. For example, ray-volume and/or ray-triangle intersection testing may be performed by the programmable execution unit 65 (e.g. in software).

The process of determining whether a triangle primitive intersection point 24 is opaque (e.g. step 433 of FIG. 4B) can typically involve retrieving and sampling an alpha texture for the intersected triangle primitive 25. However, it has been recognised that this can be associated with significant processing, memory and bandwidth requirements.

One way to accelerate the determination of whether a triangle primitive intersection point 24 is opaque (e.g. step 433 of FIG. 4B) is the use of opacity micromaps. An opacity micromap (barycentrically) sub-divides a triangle primitive into a micromesh of equally sized and shaped sub-triangles, and encodes opacity information for each sub-triangle. This can allow fine detail opacity information to be more efficiently encoded and processed, e.g. as compared to more traditional texture-based approaches.

FIG. 7 illustrates micromap sub-division of a triangle primitive 700 into three different possible micromeshes of sub-triangles.

Figure 7A:
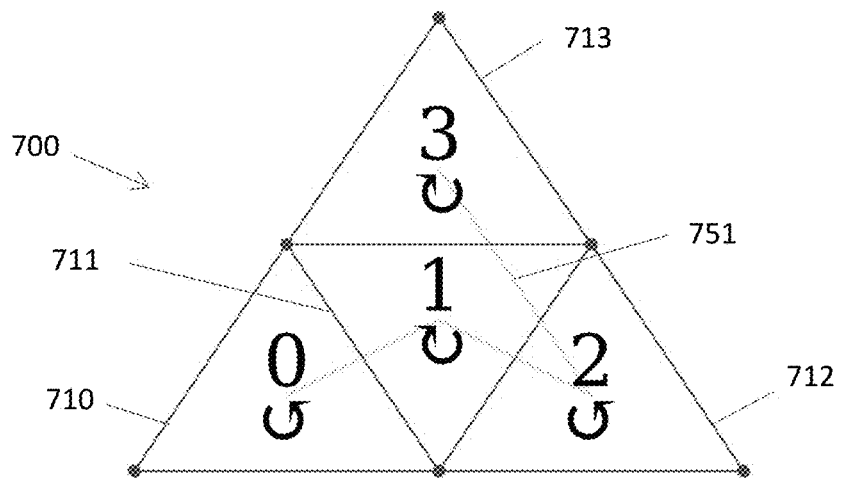
FIG. 7A, FIG. 7B and FIG. 7C illustrate micromap sub-division and indexing.

FIG. 7A shows a first "level" of sub-division, in which a triangle primitive 700 is sub-divided into a micromesh of four equally sized and shaped sub-triangles 710-713. As illustrated in FIG. 7A, each such first-level sub-triangle 710-713 is associated with an index (0-3) that uniquely identifies the respective first-level sub-triangle (at the first sub-division level). As illustrated in FIG. 7A, the indices are defined in a predetermined (e.g. API defined) order on the basis of a first-level area filling curve 751.

In these examples, as illustrated in FIG. 7, an area filling curve is based on traversing triangle edges with alternating winding directions (e.g. as described in the Vulkan specification). Other arrangements may be possible.

Figure 7B:
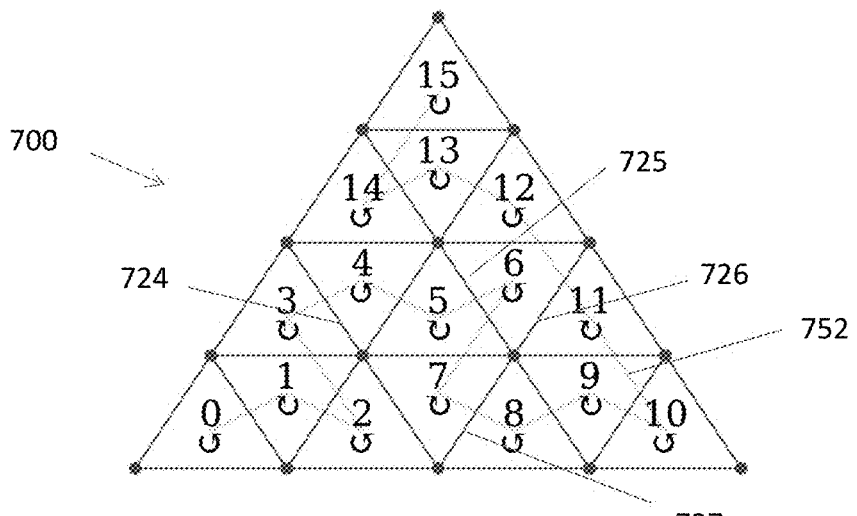

FIG. 7B shows a second level of sub-division, in which triangle primitive 700 is sub-divided into a micromesh of sixteen equally sized and shaped sub-triangles. In this case, each of the first-level sub-triangles 710-713 is effectively sub-divided into four equally sized and shaped second-level sub-triangles. For example, first-level sub-triangle 711 is sub-divided into four second-level sub-triangles 724-727. As illustrated in FIG. 7B, each second-level sub-triangle is associated with an index (0-15) that uniquely identifies the respective second-level sub-triangle (at the second sub-division level). As illustrated in FIG. 7B, the indices are defined in a predetermined (e.g. API defined) order on the basis of a second-level area filling curve 752.

Figure 7C:
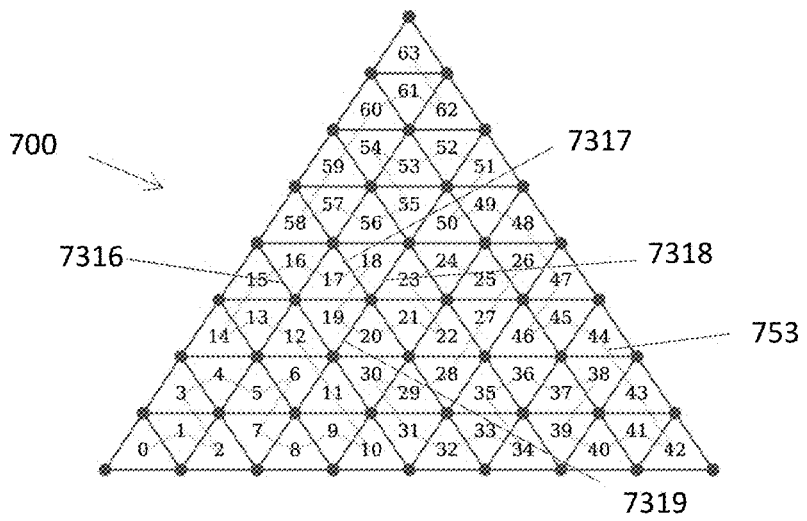

FIG. 7C shows a third level of sub-division, in which triangle primitive 700 is sub-divided into a micromesh of sixty-four equally sized and shaped sub-triangles. In this case, each of the second-level sub-triangles is effectively sub-divided into four equally sized and shaped third-level sub-triangles. For example, second-level sub-triangle 724 is sub-divided into four third-level sub-triangles 7316-7319. As illustrated in FIG. 7C, each third-level sub-triangle is associated with an index (0-63) that uniquely identifies the respective third-level sub-triangle (at the third sub-division level). As illustrated in FIG. 7C, the indices are defined in a predetermined (e.g. API defined) order on the basis of a third-level area filling curve 753.

Higher sub-division levels can be defined in a similar manner, i.e. by sub-dividing a triangle primitive into a micromesh of $22n$ equally sized and shaped sub-triangles, where n is the (integer) sub-division level. In principle, any sub-division level would be possible. In practice, there may typically be an upper limit on sub-division level, such as $n \leq 16$.

One or more micromaps may be defined by an application programmer, and e.g. provided to the graphics processor 2, 60 by driver 11 together with graphics commands. The one or more micromaps may be referred to by, or incorporated in, a ray tracing acceleration data structure, and used by the graphics processor 2, 60 during ray tracing acceleration data structure traversal.

Figure 8:
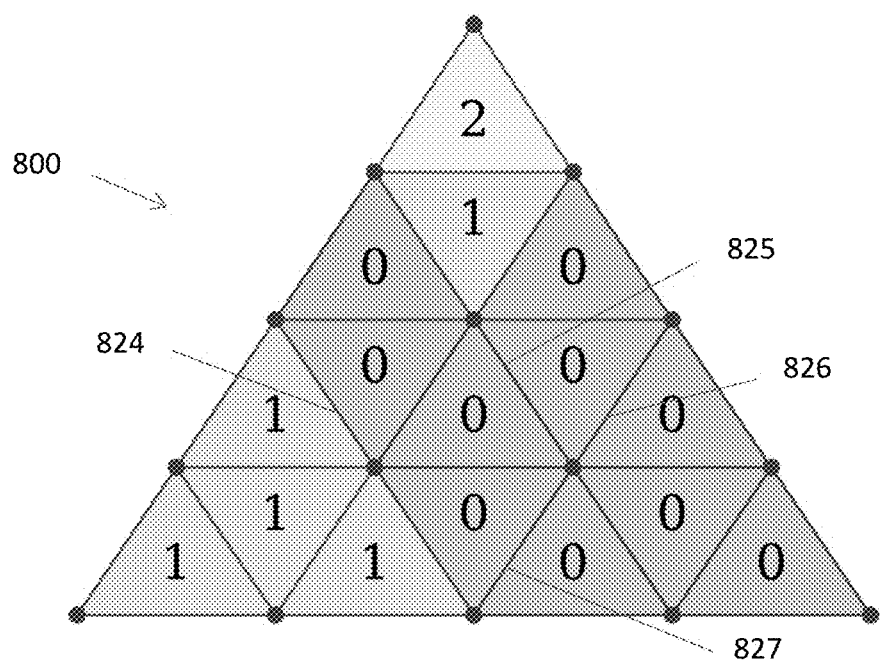
FIG. 8 illustrates an exemplary opacity micromap.

FIG. 8 shows an exemplary "second-level" opacity micromap 800 that defines a respective opacity value for each second-level sub-triangle. In this example, each opacity value can indicate one of four possible states (e.g. and be encoded as two bits per sub-triangle): a value of "0" indicating fully transparent, a value of "1" indicating fully opaque, a value "2" indicating partially transparent, and a value of "3" indicating partially opaque. Other encodings are possible. For example, it would be possible for an opacity value to indicate one of two possibilities: e.g. a value of "0" indicating transparent, and a value of "1" indicating opaque (e.g. encoded as a single bit per sub-triangle).

Figure 9:
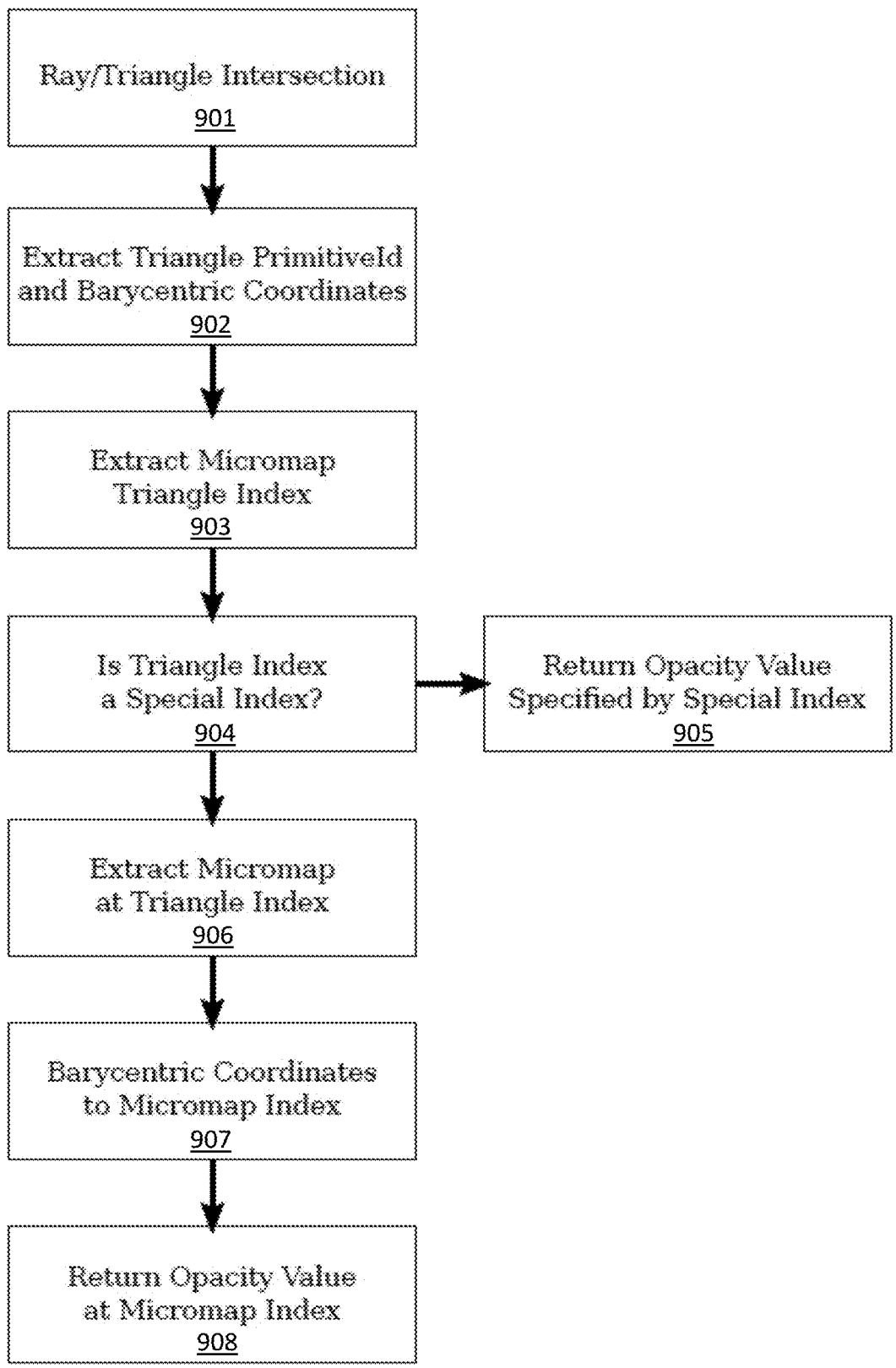
FIG. 9 is a flow chart illustrating a process for determining an opacity value from a micromap.

FIG. 9 illustrates a process for determining an opacity value for a triangle primitive intersection point 24 (e.g. corresponding to step 433 of FIG. 4B). As illustrated in FIG. 9, the process begins (at step 901) with determining that a ray intersects a triangle primitive 25 (e.g. corresponding to step 432 of FIG. 4B). When a ray is found to intersect a triangle primitive 25, an identifier for the intersected triangle primitive 25 and the intersection point 24 (in barycentric coordinates) are determined (at step 902), and it is determined (at steps 903, 904) whether the intersected triangle primitive 25 is associated with (only) a single opacity value, or is associated with a (multi-value) opacity micromap 800.

If the intersected triangle primitive 25 is associated with (only) a single opacity value, then that opacity value is returned (at step 905). If, on the other hand, the intersected triangle primitive 25 is associated with a (multi-value) opacity micromap 800, the associated opacity micromap 800 is retrieved (at step 906), and the micromap index corresponding to the intersection point 24 is determined (at step 907). The opacity value stored for the determined micromap index is then returned (at step 908).

In the present embodiments, if an opacity value of "0" (indicating fully transparent) is returned, the ray-triangle intersection event may be effectively ignored, and the process may return to acceleration data structure traversal. If an opacity value of "2" or "3" (indicating partially transparent or opaque) is returned, execution of an appropriate shader program ("any-hit shader") may be triggered (e.g. corresponding to step 434 of FIG. 4B). Otherwise, if an opacity value of "1" (indicating fully opaque) is returned, the intersection may be committed without executing a shader program (e.g. corresponding to step 440 of FIG. 4B). Other arrangements would be possible.

Although, as discussed above, the use of opacity micromaps can allow improved encoding and processing efficiency, the inventor believes that there remains scope for further improvements.

In particular, the inventor has recognised that micromaps can be efficiently represented as four-way trees. This is illustrated by FIG. 10, which shows the opacity micromap 800 of FIG. 8 represented as a four-way tree structure.

Figure 10A:
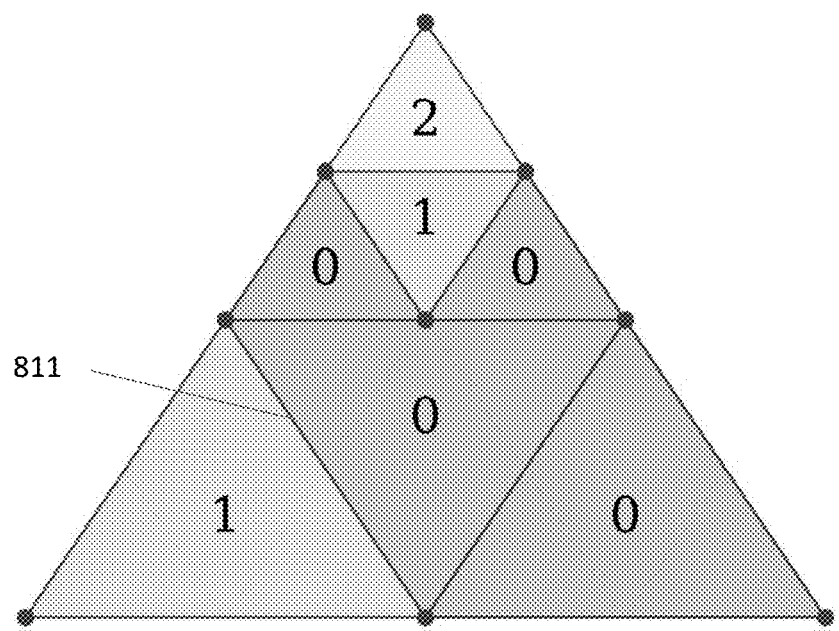
FIG. 10A and FIG. 10B illustrate a tree representation of the micromap of FIG. 8 in accordance with embodiments.

As illustrated by FIG. 10A, where opacity values are equal for each lower-level sub-triangle encompassed by a higher-level sub-triangle, a single opacity value representing the higher-level sub-triangle (and any lower-level sub-triangle encompassed by the higher-level sub-triangle) can be stored instead of storing separate opacity values for each of the lower-level sub-triangles. This can accordingly reduce the number of opacity values that need to be stored.

For example, since (as shown in FIG. 8) each opacity value for second-level sub-triangles 824-827 is equal to "0", a single opacity value of "0" may be stored to represent the corresponding first-level sub-triangle 811 (as shown in FIG. 10A).

Figure 10B:
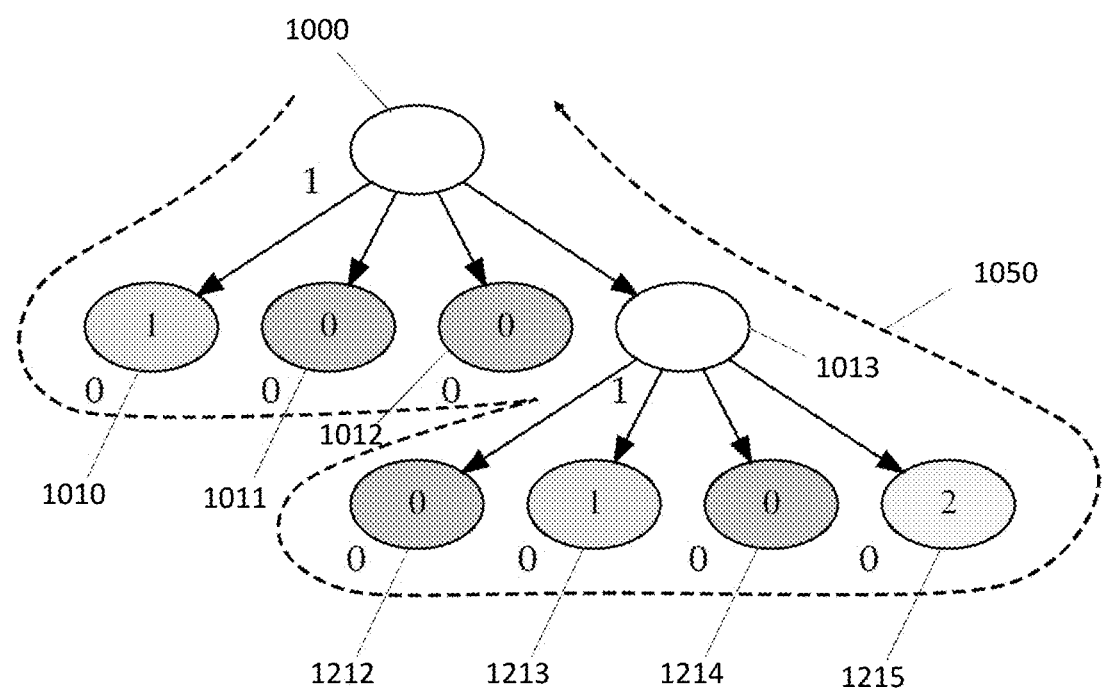

FIG. 10B illustrates the corresponding tree representation of micromap 800. As shown in FIG. 10B, in this example, the tree representation includes a root node 1000 that represents the entire micromap 800, first-level nodes 1010-1013 that represent respective first-level sub-triangles, and second-level nodes 1212-1215 that represent respective second-level sub-triangles.

Each node is either a leaf (end) node or an internal (parent) node. As shown in FIG. 10B, each leaf node (e.g. nodes 1010-1012, 1212-1215) stores a respective opacity value for the sub-triangle that the node represents, whereas each internal node (e.g. nodes 1000, 1013) does not store an opacity value but refers to four respective child nodes that represent the four lower-level sub-triangles that are encompassed by the higher-level (sub-) triangle that the internal node represents.

Thus, for example, as shown in FIG. 10A, a single opacity value of "0" is stored at node 1011 to represent the corresponding first-level sub-triangle 811, and consequently the four second-level sub-triangles 824-827 that first-level sub-triangle 811 encompasses. This reduces the number of opacity values stored, e.g. as compared to storing four separate opacity values for second-level sub-triangles 824-827.

A tree representation of an opacity micromap may be represented by storing each opacity value in an array having an element associated with each possible node of the tree, with a marker for absent elements. However, the inventor has recognised that it is possible to succinctly encode a tree representation, and thereby reduce the number of bits required to store the tree representation.

For example, as illustrated in FIG. 10B, the tree structure can be succinctly encoded by traversing the tree in a predetermined order 1050 and representing each encountered internal node with "1", and each encountered leaf node with "0". In this case, the predetermined order 1050 corresponds to a depth first tree traversal, but other orders, such as breadth first, would be possible.

FIG. 11A shows a resulting array 1101 that succinctly encodes the shape of the tree structure of FIG. 10B. As illustrated in FIG. 11A, the opacity values for the leaf nodes of the tree structure may be stored in a separate array 1102 having a respective element corresponding to each leaf node.

The arrays 1101, 1102 may be stored as two separate bit strings. For example, FIG. 11B illustrates a first bit string 1111 that encodes the tree shape (in the reverse order to FIG. 11A) using one bit per node, and a second bit string 1112 that encodes the leaf node opacity values (in the reverse order) using two bits per opacity value. (Where two-state opacity values are used, e.g. as described above, there may be only one bit per opacity value.) The bit strings may be stored in two separate memory regions, or stored together, e.g. concatenated using an offset value indicating the end and/or start of one of the bit strings, or interleaved. The tree can then be recovered by appropriately reading and interpreting the bit strings 1111, 1112 based on the predetermined order in which the bits were stored.

FIG. 12 illustrates a succinct encoding which can further reduce the number of bits required to store a micromap as a tree, e.g. as compared to the arrangement of FIG. 11. In this embodiment, tree shape and opacity values are encoded together in a single bit string.

Figures 12A, 12B:
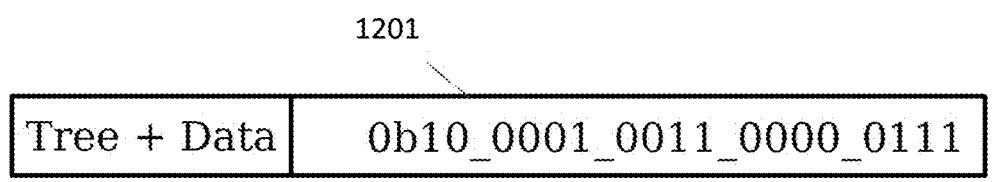
FIG. 12A and FIG. 12B illustrate a succinct encoding of the tree representation of FIG. 10B in accordance with another embodiment.

As illustrated by FIG. 12A, in this embodiment, a leaf node having an opacity value of "0" (i.e. a fully transparent leaf node) is encoded by "00", a leaf node having an opacity value of "1" (i.e. a fully opaque leaf node) is encoded by "01", a leaf node having an opacity value of "2" or "3" (i.e. a partially transparent leaf node or a partially opaque leaf node) is encoded by "10", and an internal node is encoded by "11", with the order of the values in the bit string implicitly defining the tree, as above. FIG. 12B illustrates a resulting bit string 1201 that encodes the tree structure of FIG. 10B (and thus the micromap 800 of FIG. 8) using two bits per node. The tree can then be recovered by appropriately reading and interpreting the bit string 1201 based on the predetermined order in which the bits were stored.

Figure 13:
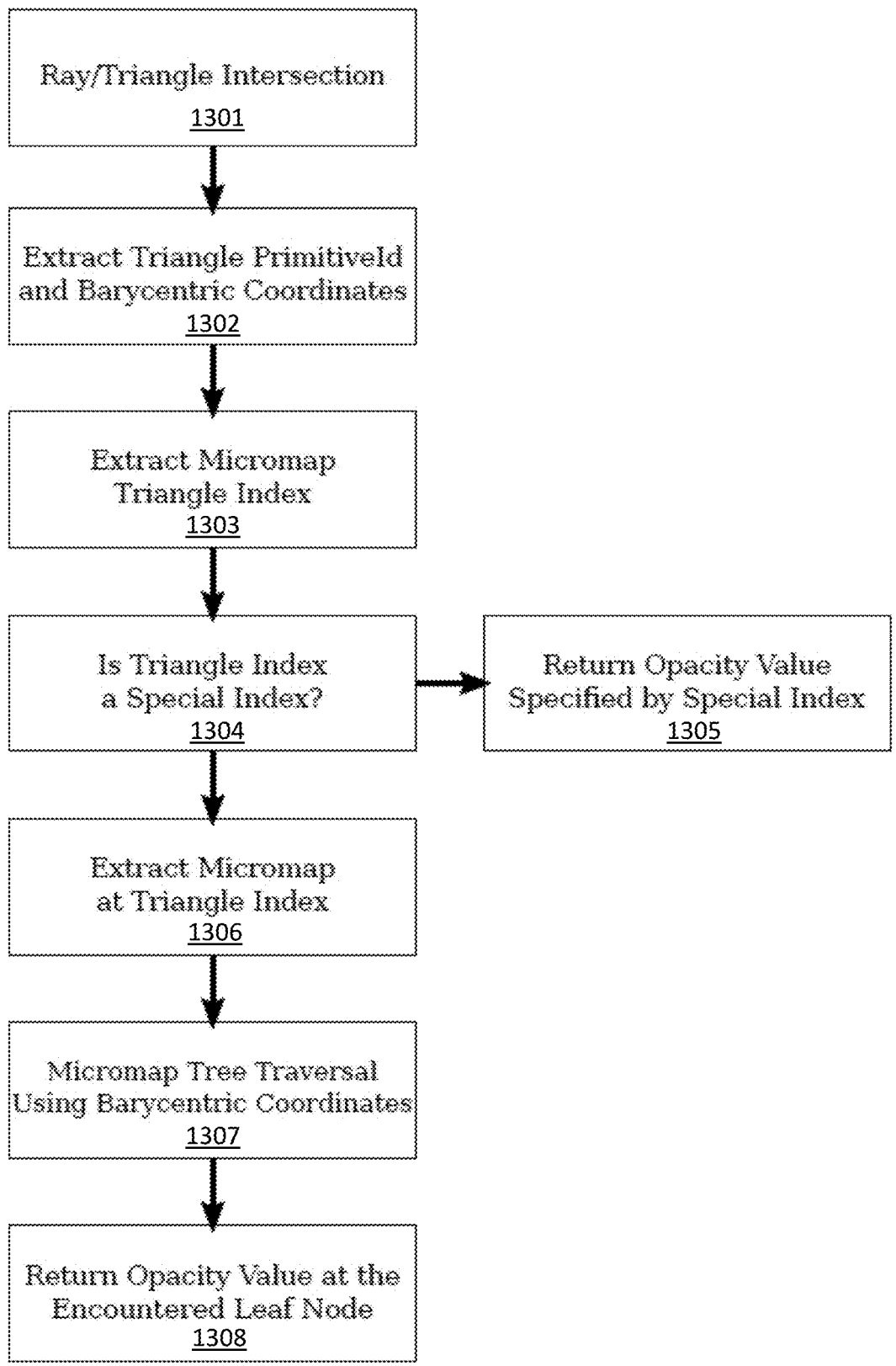
FIG. 13 is a flow chart illustrating a process for determining an opacity value from a tree representation of a micromap in accordance with embodiments.

FIG. 13 illustrates a process for determining an opacity value for a triangle primitive intersection point 24 (e.g. corresponding to step 433 of FIG. 4B), in accordance with embodiments of the technology described herein. As illustrated in FIG. 13, the process begins (at step 1301) with determining that a ray intersects a triangle primitive 25 (e.g. corresponding to step 432 of FIG. 4B). When a ray is found to intersect a triangle primitive 25, an identifier for the intersected triangle primitive 25 and the intersection point 24 (in barycentric coordinates) are determined (at step 1302).

In the present embodiment, the ray tracing acceleration data structure stores, for each triangle primitive, information indicating whether the respective triangle primitive is associated with (only) a single opacity value or a (multi-value) opacity micromap. The information may also indicate micromap sub-division level. This information is retrieved (at step 1303), and used (at step 1304) to determine whether the intersected triangle primitive 25 is associated with (only) a single opacity value, or is associated with a (multi-value) opacity micromap 800.

If the intersected triangle primitive 25 is associated with (only) a single opacity value, then that opacity value is returned (at step 1305). If, on the other hand, the intersected triangle primitive 25 is associated with an opacity micromap 800, the bit string representing the tree representing the associated opacity micromap 800 is retrieved and decoded (at step 1306).

The tree is then traversed (at step 1307) until a leaf node corresponding to the intersection point 24 is reached. In the present embodiments, the tree traversal starts at the root node, and when an internal node is encountered, the traversal proceeds to the child node corresponding to the intersection point 24. When a leaf node is reached, the opacity value stored for the leaf node is returned (at step 1308).

Each and every micromap may be represented and stored as a tree representation. However, the inventor has realised that it may not always be advantageous to store and process a micromap as a tree representation. For example, a micromap that defines opacity values that are all different may only be representable as a tree with a full set of lowest-level leaf nodes, such that storage and/or processing requirements may be greater for the tree representation than for the original micromap. In such cases, a micromap may be stored and processed in its original form, e.g. as described with reference to FIG. 9.

It will be appreciated that embodiments of the technology described herein can significantly reduce the amount of storage required to store micromaps. This can allow a more detailed micromap to be stored in a given amount of storage space. This can reduce the number of shader calls required to perform ray tracing, thereby improving ray tracing performance.

Although the above embodiments have been described with particular reference to efficiently handling micromaps for triangular primitives, it would be possible to handle other self-similar primitive shapes (such as rectangles, e.g. squares) in a corresponding manner.

Similarly, although the above embodiments have been described with particular reference to micromaps that store opacity values, values of other properties could be stored, such as scalars, colours, normals or other rendering properties.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics processing system that is operable to render a scene represented by primitives by tracing rays through the scene and controlling interactions between rays and sub-regions of primitives using property values defined by one or more micromaps;

the method comprising:
  providing a micromap that defines property values for sub-regions of a primitive of the scene to be rendered; and
  generating a tree representation of the micromap;
  the method further comprising rendering the scene by tracing rays through the scene, and when it is desired to determine whether and/or how a ray and a sub-region of the primitive interact:

traversing the tree representation of the micromap to determine a property value for the sub-region of the primitive; and using the determined property value to determine whether and/or how the ray and the sub-region of the primitive interact;

wherein generating the tree representation of the micromap comprises reducing a number of end nodes that the tree representation has; and wherein reducing the number of end nodes that the tree representation has comprises:

determining whether all of the property values defined by the micromap for a set of primitive sub-regions that could be represented by an internal node of the tree representation share the same value; and when it is determined that all of the property values defined by the micromap for the set of primitive sub-regions that could be represented by the internal node of the tree representation share the same value: representing the set of primitive sub-regions as a single end node of the tree representation.

2. The method of claim 1, wherein the primitive is a triangle primitive.

3. The method of claim 1, wherein the micromap is an opacity micromap.

4. The method of claim 1, further comprising generating and storing data representing the tree representation of the micromap, wherein generating and storing data representing the tree representation of the micromap comprises:

generating, for each node of the tree representation, a piece of data indicating whether the node is an internal node or an end node; and storing the pieces of data in an order based on a structure of the tree representation, such that the stored data encodes the structure of the tree representation.

5. The method of claim 4, wherein each piece of data generated for an end node of the tree representation further indicates a property value defined by the end node.

6. The method of claim 5, wherein a size of each piece of data is only two bits.

7. The method of claim 1, comprising determining whether representing the micromap as a tree representation is associated with a decrease in processing and/or storage requirements; and generating the tree representation when it is determined that representing the micromap as a tree representation is associated with a decrease in processing and/or storage requirements.

8. A method of storing a micromap for use by a graphics processor that is operable to render a scene represented by primitives by tracing rays through the scene and controlling interactions between rays and sub-regions of primitives using property values defined by one or more micromap; the method comprising:

generating a tree representation of the micromap that defines property values for sub-regions of a primitive of the scene to be rendered; and generating and storing data representing the tree representation of the micromap;

wherein generating and storing data representing the tree representation of the micromap comprises:

generating, for each node of the tree representation, a piece of data indicating a type of the respective node; and storing the pieces of data in an order based on a structure of the tree representation, such that the stored data encodes the structure of the tree representation; and wherein generating the tree representation of the micromap comprises reducing a number of end nodes that the tree representation has; and wherein reducing the number of end nodes that the tree representation has comprises:

determining whether all of the property values defined by the micromap for a set of primitive sub-regions that could be represented by an internal node of the tree representation share the same value; and when it is determined that all of the property values defined by the micromap for the set of primitive sub-regions that could be represented by the internal node of the tree representation share the same value: representing the set of primitive sub-regions as a single end node of the tree representation.

9. A non-transitory computer readable storage medium storing software code which when executing on a processor performs the method of claim 8.

10. A graphics processing system that is operable to render a scene represented by primitives by tracing rays through the scene and controlling interactions between rays and sub-regions of primitives using property values defined by one or more micromaps; the graphics processing system comprising:

a tree representation generating circuit configured to generate a tree representation of a micromap that defines property values for sub-regions of a primitive of the scene to be rendered; and a rendering circuit configured to render the scene by tracing rays through the scene, and when it is desired to determine whether and/or how a ray and a sub-region of the primitive interact:

traverse the tree representation of the micromap generated by the tree representation generating circuit to determine a property value for the sub-region of the primitive; and use the determined property value to determine whether and/or how the ray and the sub-region of the primitive interact;

wherein the tree representation generating circuit is configured to reduce a number of end nodes of the tree representation by:

determining whether all of the property values defined by the micromap for a set of primitive sub-regions that could be represented by an internal node of the tree representation share the same value; and when it is determined that all of the property values defined by the micromap for the set of primitive sub-regions that could be represented by the internal node of the tree representation share the same value: representing the set of primitive sub-regions as a single end node of the tree representation.

11. The system of claim 10, wherein the primitive is a triangle primitive.

12. The system of claim 10, wherein the micromap is an opacity micromap.

13. The system of claim 10, further comprising:

an encoding circuit configured to generate and store data representing the tree representation of the micromap generated by the tree representation generating circuit by:

generating, for each node of the tree representation, a piece of data indicating whether the node is an internal node or an end node; and storing the pieces of data in an order based on a structure of the tree representation, such that the stored data encodes the structure of the tree representation; and a decoding circuit configured to:

retrieve pieces of data representing the tree representation of the micromap stored by the encoding circuit;

determine, from each retrieved piece of data, whether a node of the tree representation is an internal node or an end node; and determine, from an order in which the pieces of data are stored, the structure of the tree representation.

14. The system of claim 13, wherein the encoding circuit is configured such that each piece of data generated for an end node of the tree representation further indicates a property value defined by the end node; and the decoding circuit is configured to determine a property value from a retrieved piece of data that represents an end node.

15. The system of claim 14, wherein a size of each piece of data is only two bits.

16. The system of claim 10, comprising a determining circuit configured to determine whether representing the micromap as a tree representation is associated with a decrease in processing and/or storage requirements; and cause the tree representation generating circuit to generate the tree representation of the micromap when it is determined that representing the micromap as a tree representation is associated with a decrease in processing and/or storage requirements.

17. A graphics processing system that is operable to render a scene represented by primitives by tracing rays through the scene and controlling interactions between rays and sub-regions of primitives using property values defined by one or more micromaps; the graphics processing system comprising:

a tree representation generating circuit configured to generate a tree representation of a micromap that defines property values for sub-regions of a primitive of the scene to be rendered; and a rendering circuit configured to render the scene by tracing rays through the scene, and when it is desired to determine whether and/or how a ray and a sub-region of the primitive interact:

traverse the tree representation of the micromap generated by the tree representation generating circuit to determine a property value for the sub-region of the primitive; and use the determined property value to determine whether and/or how the ray and the sub-region of the primitive interact;

the system further comprising:

an encoding circuit configured to generate and store data representing the tree representation of the micromap generated by the tree representation generating circuit by:

generating, for each node of the tree representation, a piece of data indicating whether the node is an internal node or an end node; and storing the pieces of data in an order based on a structure of the tree representation, such that the stored data encodes the structure of the tree representation; and a decoding circuit configured to:

retrieve pieces of data representing the tree representation of the micromap stored by the encoding circuit;

determine, from each retrieved piece of data, whether a node of the tree representation is an internal node or an end node; and determine, from an order in which the pieces of data are stored, the structure of the tree representation.

* * * * *